US008976965B2

(12) United States Patent
Aminzade

(10) Patent No.: US 8,976,965 B2
(45) Date of Patent: Mar. 10, 2015

(54) MOBILE COMPUTING DEVICE AND WEARABLE COMPUTING DEVICE HAVING AUTOMATIC ACCESS MODE CONTROL

(71) Applicant: Google Inc., Mountain View, CA (US)

(72) Inventor: Daniel Aminzade, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/044,558

(22) Filed: Oct. 2, 2013

(65) Prior Publication Data

US 2015/0039880 A1   Feb. 5, 2015

Related U.S. Application Data

(60) Provisional application No. 61/859,861, filed on Jul. 30, 2013.

(51) Int. Cl.
*H04K 1/00* (2006.01)
*G06F 9/445* (2006.01)
*H04L 29/06* (2006.01)

(52) U.S. Cl.
CPC .......... *G06F 9/44505* (2013.01); *H04L 63/107* (2013.01)
USPC ........................................................ 380/258

(58) Field of Classification Search
None
See application file for complete search history.

(56) References Cited

U.S. PATENT DOCUMENTS

| 4,536,754 | A | 8/1985 | Holce et al. |
| 4,598,394 | A | 7/1986 | Nonaka |
| 4,901,291 | A * | 2/1990 | Kurata ........................... 367/111 |
| 7,054,595 | B2 * | 5/2006 | Bann ............................. 455/41.2 |
| 7,257,374 | B1 * | 8/2007 | Creigh .......................... 455/41.2 |
| 7,373,657 | B2 * | 5/2008 | Walker ............................... 726/4 |
| 7,618,260 | B2 | 11/2009 | Daniel et al. |
| 7,751,285 | B1 | 7/2010 | Cain |
| 7,773,972 | B2 * | 8/2010 | Croome et al. ............... 455/411 |
| 8,045,961 | B2 * | 10/2011 | Ayed et al. ..................... 455/411 |
| 8,143,983 | B1 | 3/2012 | Lauder et al. |
| 8,242,868 | B2 | 8/2012 | Lauder et al. |
| 8,813,194 | B2 * | 8/2014 | Sposato et al. ..................... 726/4 |
| 8,833,651 | B2 * | 9/2014 | Brown et al. .................. 235/382 |
| 2002/0069030 | A1 | 6/2002 | Xydis |

(Continued)

FOREIGN PATENT DOCUMENTS

EP    2407948 A1    1/2012

OTHER PUBLICATIONS

Jacob Sten, Sony Ericsson Mobile Communications, LiveView micro display, Aug. 2010, Retrieved 20131227.*

(Continued)

*Primary Examiner* — Lisa Lewis
*Assistant Examiner* — Olanrewaju Bucknor
(74) *Attorney, Agent, or Firm* — Shumaker & Sieffert, P.A.

(57) ABSTRACT

A system can include a mobile computing device and a wearable computing device. The wearable computing device can include a sensor that outputs an indication that the wearable computing device is being worn. In some examples, one or both of the devices can be operable to determine that the devices are within a threshold distance of each other. Responsive to receiving the indications that the wearable computing device is being worn and the devices are within the threshold distance of each other, one or both of the devices can be operable to change an access mode of computing environment provided by the respective device from a reduced access mode to an increased access mode.

27 Claims, 8 Drawing Sheets

(56) References Cited

U.S. PATENT DOCUMENTS

| | | | |
|---|---|---|---|
| 2002/0115478 A1* | 8/2002 | Fujisawa et al. | 455/567 |
| 2002/0135615 A1* | 9/2002 | Lang | 345/764 |
| 2003/0025603 A1 | 2/2003 | Smith | |
| 2004/0143750 A1 | 7/2004 | Kulack et al. | |
| 2005/0071647 A1 | 3/2005 | Fujinuma et al. | |
| 2005/0280546 A1* | 12/2005 | Ganley et al. | 340/573.4 |
| 2008/0007388 A1* | 1/2008 | Au et al. | 340/5.64 |
| 2008/0169350 A1 | 7/2008 | Audebert et al. | |
| 2010/0056340 A1 | 3/2010 | Ellis et al. | |
| 2010/0112964 A1* | 5/2010 | Yi et al. | 455/90.3 |
| 2010/0124949 A1* | 5/2010 | Demuynck et al. | 455/569.1 |
| 2010/0274859 A1 | 10/2010 | Bucuk | |
| 2011/0293095 A1* | 12/2011 | Ben Ayed | 380/270 |
| 2012/0050532 A1 | 3/2012 | Rhyins | |
| 2012/0206296 A1* | 8/2012 | Wan | 342/357.31 |
| 2012/0243823 A1 | 9/2012 | Giboney | |
| 2013/0005266 A1* | 1/2013 | Singh | 455/41.2 |
| 2013/0044215 A1* | 2/2013 | Rothkopf et al. | 348/143 |
| 2013/0069787 A1 | 3/2013 | Petrou | |
| 2013/0139561 A1* | 6/2013 | Parto et al. | 70/278.7 |

OTHER PUBLICATIONS

Richard Lai, Engadget_sony-ericsson-liveview_20101201_Retrieved_20131227.*

Dellutri et al., "Local Authentication with Bluetooth Enabled Mobile Devices," Proceedings of the Joint International Conference on Automatic and Autonomous Systems and International Conference on Networking and Services, Oct. 2005, 6 pages.

Citizen Eco-Drive Proximity Bluetooth Watch, downloadable from http://blog.princetonwatches.com/citizen-eco-drive-proximity-bluetooth-watch/, downloaded on May 5, 2013, 6 pages.

EZ Secure Proximity Computer Lock, downloadable from http://www.vupointsolutions.com/ex_proximity_computer_lock_clip_on, downloaded on May 5, 2013, 2 pages.

Office Action from U.S. Appl. No. 14/095,573, dated Feb. 24, 2014, 20 pp.

Response to Office Action dated Feb. 24, 2014, from U.S. Appl. No. 14/095,573, filed May 27, 2014, 15 pp.

Response to Final Office Action dated Jun. 30, 2014, from U.S. Appl. No. 14/095,573, filed Sep. 30, 2014, 12 pp.

Notice of Allowance from U.S. Appl. No. 14/095,573, dated Oct. 22, 2014, 8 pp.

International Search Report and Written Opinion from International Application No. PCT/US2014/047878, dated Oct. 27, 2014, 8 pp.

\* cited by examiner

MOBILE COMPUTING DEVICE AND WEARABLE COMPUTING DEVICE HAVING AUTOMATIC ACCESS MODE CONTROL

This application claims the benefit of U.S. Provisional Patent Application No. 61/859,861, filed Jul. 30, 2013, the entire content of which is incorporated herein by reference.

BACKGROUND

Some computing devices are configured to operate in multiple access modes, such as a reduced access mode, in which the computing device permits a user of a device to access a reduced set of functionality provided by the computing device, and an increased access mode, in which the computing device permits a user to access a larger or a complete set of functionality provided by the computing devices. In some examples, computing devices may present one or more security challenges that a user is required to complete in order to change the access mode from the reduced access mode to the increased access mode. For example, a computing device may output, for display at a display device, a user interface screen including one or more user interface elements that prompt a user to input security information, such as a password, a personal identification number (PIN), a pattern or biometric data (e.g., fingerprint, voice, image, or the like). In response to receiving indications of the security information, the computing device may compare the input security information to a saved copy of the security information, and, upon confirming a match, may change from the reduced access mode to the increased access mode.

SUMMARY

In one example, the disclosure describes a method including receiving, by a processor of a wearable computing device and from a sensor, an indication that the wearable computing device is being worn by a user. In accordance with this example, the method also includes, changing, by the processor of the wearable computing device, based at least in part on the indications that the wearable computing device is being worn and that the distance is less than the threshold distance, an access mode of a computing environment provided by the wearable computing device from a reduced access mode to an increased access mode. Additionally, the method can include transmitting, by the wearable computing device, to the mobile computing device, an instruction to change an access mode of a computing environment provided by the mobile computing device from a reduced access mode to an increased access mode.

In another example, the disclosure describes a system that includes a mobile computing device comprising one or more mobile computing device processors. The system also includes a wearable computing device comprising one or more wearable computing device processors and a sensor, wherein the sensor is configured to generate an indication that the wearable computing device is being worn by a user. In accordance with this example, the system also includes a mobile computing device access mode module operable by the one or more mobile computing device processors to receive the indication that the wearable computing device is being worn by the user and change, based at least in part on the indication that the wearable computing device is being worn by the user and an indication that a distance between the wearable computing device and the mobile computing device is less than a threshold distance, an access mode of a computing environment provided by the mobile computing device from a reduced access mode to an increased access mode. The system additionally can include a wearable computing device access mode module operable by the one or more wearable computing device processors to receive the indication that the wearable computing device is being worn by the user and change, based at least in part on the indication that the wearable computing device is being worn by the user and the indication that the distance between the wearable computing device and the mobile computing device is less than the threshold distance, an access mode of a computing environment provided by the wearable computing device from a reduced access mode to an increased access mode.

In another example, the disclosure describes a computer-readable storage device storing instructions that, when executed, cause at least one processor of a mobile computing device to receive, from a wearable computing device, an indication that the wearable computing device is being worn by a user, and determine that a distance between the wearable computing device and the mobile computing device is less than a threshold distance. The instructions, when executed, also cause the at least one processor to change, based at least in part on the indication that the wearable computing device is being worn by the user and the determination that the distance between the wearable computing device and the mobile computing device is less than the threshold distance, an access mode of the computing environment provided by the mobile computing device from a reduced access mode to an increased access mode. Further, the instructions, when executed, also cause the at least one processor to transmit, to the wearable computing device, an instruction to change an access mode of a computing environment provided by the wearable computing device from a reduced access mode to an increased access mode.

The details of one or more examples are set forth in the accompanying drawings and the description below. Other features, objects, and advantages will be apparent from the description and drawings, and from the claims.

DETAILED DESCRIPTION

Figure 1:
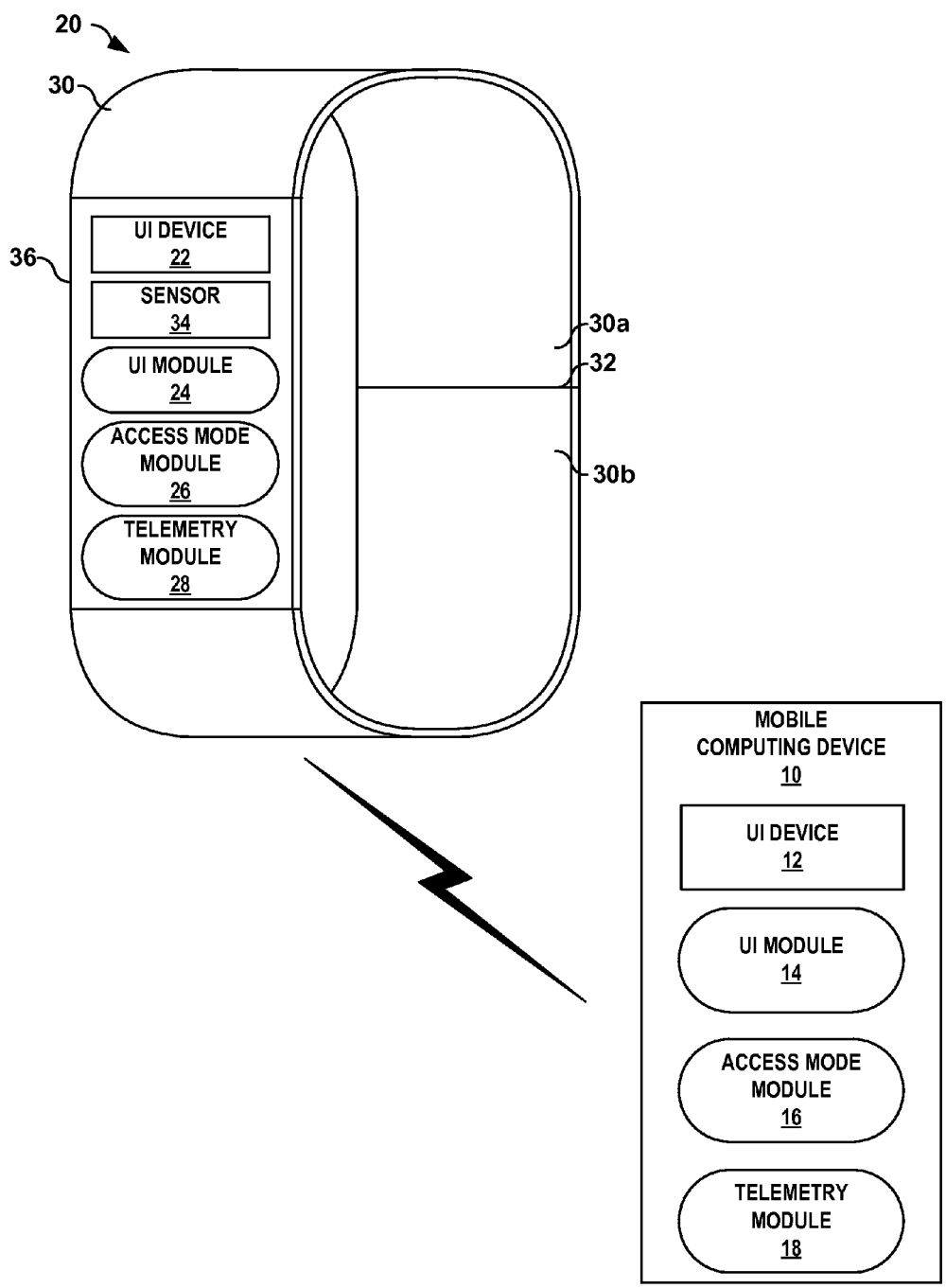
FIG. 1 is a conceptual block diagram illustrating an example system including a mobile computing device and a wearable computing device, in which the devices are operable to change access modes based at least in part on indications that the wearable computing device being worn by a user and the devices are within a threshold distance of each other, in accordance with one or more techniques of the present disclosure.

Techniques according to the disclosure describes a system including a mobile computing device and a wearable computing device, which can be communicatively coupled, e.g., using a wireless communication protocol. The wearable computing device can include at least one sensor that outputs an indication that the wearable computing device is being worn by a user. Responsive to receiving the indication that the wearable computing device is being worn and based at least in part on an indication that the devices are within a threshold distance of each other, one or both of the devices can be operable to change an access mode of computing environment provided by the respective device from a reduced access mode to an increased access mode. In some examples, one or both of the mobile computing device and the wearable computing device can be operable to determine that the devices are within the threshold distance of each other. In other examples, the indication that the devices are within the threshold distance of each other may be a presence of a wireless communication coupling between the devices.

In some examples, responsive to receiving the indication that the wearable computing device is being worn and based at least in part on an indication that the devices are within a threshold distance of each other, one or both of the devices can be operable to output a security challenge. The security challenge may include a user interface screen that prompts a user of the wearable computing device to input a security challenge response, such as a password, a PIN, a pattern, biometric data (e.g., fingerprint, voice, image, or the like), etc. Responsive to verifying the response to the security challenge against a saved response to the security challenge, the wearable computing device and the mobile computing device can each be operable to change an access mode of computing environment provided by the respective device from a reduced access mode to an increased access mode. When operating in the reduced access mode, the device can be operable to permit a user of the device to only access a reduced set of functionality provided by the device. When operating in the increased access mode, the device can be operable to permit the user to access a larger or a complete set of functionality provided by the device.

In some examples, the mobile computing device and the wearable computing device can be operable to remain in the increased access modes while the wearable computing device is worn by the user and the devices are within the threshold distance of each other, rather than reverting to the reduced access mode after a period of inactivity or a threshold time after the user has last interacted with the wearable computing device and/or the mobile computing device. However, responsive to receiving an indication that the devices are no longer within the threshold distance of each other, the mobile computing device may be operable to change its access mode from the increased access mode to the reduced access mode. Additionally or alternatively, responsive to receiving an indication that the wearable computing device is no longer being worn by the user, both the wearable computing device and the mobile computing device can be operable to change their respective access modes from the increased access mode to the reduced access mode.

Because the wearable computing device is being worn and the devices are within a threshold distance of each other, which can indicate that the user is maintaining control over both devices, maintaining the devices in the increased access mode until the wearable computing device is not being worn and/or the devices are not within a threshold distance of each other may not reduce security of the devices. Moreover, by not reverting to the reduced access mode, even after a period of inactivity, while the wearable computing device is being worn and/or the devices are within a threshold distance of each other, the wearable computing device and the mobile computing device may allow the user to more easily interact with a larger or complete set of functionality of the devices, e.g., without having to respond to another security challenge each time the user wants to interact with the device(s).

FIG. 1 is a conceptual block diagram illustrating an example system including a mobile computing device 10 and a wearable computing device 20, in which the devices 10 and 20 are operable to change access modes based at least in part on indications that the wearable computing device being worn by a user and the devices are within a threshold distance of each other, in accordance with one or more techniques of the present disclosure. In the example of FIG. 1, mobile computing device 10 includes at least one user interface (UI) device 12, a UI module 14, a mobile computing device access mode module 16, and a telemetry module 18. Other examples of mobile computing device 10 that implement techniques of this disclosure may include additional components not shown in FIG. 1. Examples of mobile computing device 10 may include, but are not limited to, portable devices such as mobile phones (including smart phones), laptop computers, tablet computers, cameras, personal digital assistants (PDAs), etc.

Wearable computing device 20 can include a UI device 22, a sensor 34, a UI module 24, a wearable computing device access mode module 26, a telemetry module 28, and a band 30. In some examples, UI device 22 and other electronic components of wearable computing device 20 may be at least partially enclosed by a housing 36. Additionally, wearable computing device 20 can include a band 30 or other member, such as a strap or frame, for physically securing wearable computing device 20 when being worn by a user. In the example of FIG. 1, band 30 is mechanically coupled to housing 36. In some examples, instead of band 30 and housing 36 being separate structures mechanically coupled to each other, band 30 and housing 36 may be a single, unitary structure. As shown in the example of FIG. 1, the first portion 30a of band 30 and second portion 30b of band 30 mechanically connect at connecting structure 32. Connecting structure 32 can include, for example, a clasp, clip, snap, buckle or other mechanism operable to physically secure first portion 30a and second portion 30b of band 20 when wearable computing device 20 is worn by a user. Other examples of wearable computing device 20 that implement techniques of this disclosure may include additional components not shown in FIG. 1.

Examples of wearable computing device 20 can include, but are not limited to, a smart watch, bracelet, wrist band, ankle band, etc.

Mobile computing device 10 can include at least one UI device 12. A user associated with mobile computing device 10 can interact with mobile computing device 10 by providing various user inputs into mobile computing device 10, e.g., using at least one UI device 12. In some examples, the at least one UI device 12 is configured to receive tactile, audio, or visual input. In addition to receiving input from a user, UI device 12 can be configured to output content such as a graphical user interface (GUI) for display, e.g., at a display device associated with mobile computing device 10. In some examples, UI device 12 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with mobile computing device 10.

As shown in FIG. 1, mobile computing device 10 also can include UI module 14. UI module 14 can perform one or more functions to receive indications of input, such as user input, and send the indications of the input to other components associated with mobile computing device 10, such as mobile computing device access mode module 16. For example, UI module 14 may receive an indication of a gesture performed by the user at UI device 12. UI module 14 may also receive information from components associated with mobile computing device 10, such as mobile computing device access mode module 16. Using the information, UI module 14 may cause other components associated with mobile computing device 10, such as UI device 12, to provide output based on the information. For instance, UI module 14 may receive information from mobile computing device access mode module 16 and cause UI device 12 to display information at a display device associated with mobile computing device 10 (e.g., which is part of mobile computing device 10 or is operably coupled to mobile computing device 10).

UI module 14 can be implemented in various ways. For example, UI module 14 can be implemented as a downloadable or pre-installed application or "app." In another example, UI module 14 can be implemented as part of a hardware unit of mobile computing device 10. In another example, UI module 14 can be implemented as part of an operating system of mobile computing device 10.

In the example of FIG. 1, mobile computing device 10 also includes a telemetry module 18. Mobile computing device 10 can utilize telemetry module 18 to communicate with external devices via one or more networks, such as one or more wireless networks. Examples of such wireless networks may include Bluetooth, 3G, and WiFi wireless networks. In some examples, mobile computing device 10 utilizes telemetry module 18 to wirelessly communicate with wearable computing device 20.

Similarly, wearable computing device 20 can include at least one UI device 22. A user associated with wearable computing device 20 may interact with wearable computing device 20 by providing various user inputs into wearable computing device 20, e.g., using at least one UI device 22. In some examples, the at least one UI device 22 is configured to receive tactile, audio, or visual input. In addition to receiving input from a user, UI device 22 can be configured to output content such as a graphical user interface (GUI) for display, e.g., at a display device associated with wearable computing device 20. In some examples, UI device 22 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with wearable computing device 20.

As shown in FIG. 1, wearable computing device 20 also can include UI module 24. UI module 24 can perform one or more functions to receive indication of input, such as user input, and send the indications of the input to other components associated with wearable computing device 20, such as wearable computing device access mode module 26. For example, UI module 24 may receive an indication of a gesture performed by the user at UI device 22. UI module 24 may also receive information from components associated with wearable computing device 20, such as wearable computing device access mode module 26. Using the information, UI module 24 may cause other components associated with wearable computing device 20, such as UI device 22, to provide output based on the information. For instance, UI module 24 may receive information from wearable computing device access mode module 26 and cause UI device 22 to display information at a display device associated with wearable computing device 20 (e.g., which is part of wearable computing device 20 or is operably coupled to wearable computing device 20).

UI module 24 may be implemented in various ways. For example, UI module 24 can be implemented as a downloadable or pre-installed application or "app." In another example, UI module 24 can be implemented as part of a hardware unit of wearable computing device 20. In another example, UI module 24 can be implemented as part of an operating system of wearable computing device 20.

In the example of FIG. 1, wearable computing device 20 also includes a telemetry module 28. Wearable computing device 20 can utilize telemetry module 28 to communicate with external devices via one or more networks, such as one or more wireless networks. Examples of such wireless networks may include Bluetooth, 3G, and WiFi wireless networks. In some examples, wearable computing device 20 utilizes telemetry module 28 to wirelessly communicate with mobile computing device 10.

In some examples, mobile computing device 10 and wearable computing device 20 may be operatively coupled to an external network using respective network links. The external network may include network hubs, network switches, network routers, etc., that are operatively inter-coupled thereby providing for the exchange of information between mobile computing device 10 and the wearable computing device 20 (and/or other computing devices). Such connections may be wireless and/or wired connections. In some examples, mobile computing device 10 may be communicatively coupled to wearable computing device 20 using direct device communication. Direct device communication may include communications through which mobile computing device 10 sends and receives data directly with wearable computing device 20, e.g., using wireless communication. That is, in some examples of direct device communication, data sent by mobile computing device 10 may not be forwarded by one or more additional devices before being received at wearable computing device 20, and vice-versa. Examples of direct device communication techniques may include Bluetooth, Near-Field Communication, infrared, etc.

Wearable computing device 20 also includes a sensor 34. Sensor 34 can be configured to detect a parameter indicative of wearable computing device 20 being worn by a user. For example, sensor 34 can include a proximity sensor, such as an infrared proximity sensor, a capacitive sensor, a light sensor, a physical button or contact, etc. Sensor 34 may be configured to detect or generate a signal when wearable computing device 20 is being worn by a user. For example, sensor 34 can be configured to be adjacent to and facing a wrist of the user when the user is wearing wearable computing device 20, such that the proximity of the user's wrist to sensor 34 generates a signal indicative of wearable computing device 20 being worn by the user or causes sensor 34 to generate a signal indicative of wearable computing device 20 being worn by the user.

In accordance with one or more aspects of the disclosure, wearable computing device 20 can also include wearable computing device access mode module 26, and mobile computing device 10 can also include mobile computing device access mode module 16. Access mode modules 16 and 26 can be implemented in various ways. For example, access mode modules 16 and 26 can be implemented as a downloadable or pre-installed application or "app." In other examples, access mode modules 16 and 26 can be implemented as part of hardware units of mobile computing device 10 and wearable computing device 20, respectively, or as part of operating systems of mobile computing device 10 and wearable computing device 20, respectively.

Wearable computing device access mode module 26 can be operable to control an access mode of a computing environment provided by wearable computing device 20. For example, wearable computing device access mode module 26 can be operable to control the computing environment between at least a reduced access mode and an increased access mode. When operating in the reduced access mode, the computing environment can be operable to permit a user of the device to access a reduced set of functionality provided by the device. When operating in the increased access mode, the computing environment can be operable to permit the user to access a larger or a complete set of functionality provided by the device.

Similarly, mobile computing device access mode module 16 can be operable to control an access mode of a computing environment provided by mobile computing device 10. For example, mobile computing device access mode module 16 can be operable to control computing environment between at least a reduced access mode and an increased access mode.

Access mode modules 16 and 26 can be operable to control the access modes of mobile computing device 10 and wearable computing device 20, respectively, based at least in part on indications that wearable computing device 20 is being worn and that mobile computing device 10 and wearable computing device 20 are located within a threshold distance of each other. For example, wearable computing device access control module 26 can be operable to receive an indication from sensor 34 that wearable computing device 20 is being worn by a user. In some examples, wearable computing device 20 can be configured to transmit, to mobile computing device 10, using telemetry module 28, the indication that wearable computing device 20 is being worn by the user.

Wearable computing device access mode module 26 and/or mobile computing device access mode module 16 can also be operable to receive an indication a distance between mobile computing device 10 and wearable computing device 20 is less than a threshold distance. In some examples, the indication that the distance between mobile computing device 10 and wearable computing device 20 is less than a threshold distance may be the presence of a wireless communication link between mobile computing device 10 and wearable computing device 20. The wireless communication link can be, for example, a direct wireless communication connection, such as Bluetooth or WiFi wireless network connection. In other examples, a respective module of one or both of mobile computing device 10 and wearable computing device 20 can be operable to determine that the distance between devices 10 and 20 is less than the threshold distance based at least in part on a wireless communication signal generated by telemetry module 18 and received by telemetry module 28, and/or a wireless communication signal generated by telemetry module 28 and received by telemetry module 18. In other examples, a respective module of one or both of mobile computing device 10 and wearable computing device 20 can be operable to determine that the distance between devices 10 and 20 is less than the threshold distance based at least in part on another type of signaling between devices 10 and 20, such as an optical signal generated by one of devices 10 and 20 and received by the other of devices 10 and 20, or an audible signal generated by one of devices 10 and 20 and received by the other of devices 10 and 20.

In some examples in which only one of mobile computing device 10 and wearable computing device 20 determines that the distance between mobile computing device 10 and wearable computing device 20 is less than the threshold distance, the one of access mode modules 16 and 26 of the device 10 or 20 that determined that the distance between mobile computing device 10 and wearable computing device 20 is less than the threshold distance can be operable to transmit, using the corresponding one of telemetry modules 18 and 28, the indication that the distance between mobile computing device 10 and wearable computing device 20 is less than the threshold distance to the other device 10 or 20. In other examples in which only one of mobile computing device 10 and wearable computing device 20 determines that the distance between mobile computing device 10 and wearable computing device 20 is less than the threshold distance, the one of access mode modules 16 and 26 that determines that the distance between mobile computing device 10 and wearable computing device 20 is less than the threshold distance may not transmit the indication that the distance between mobile computing device 10 and wearable computing device 20 is less than the threshold distance to the other device 10 or 20.

Hence, one or both of access mode modules 16 and 26 receive indications that wearable computing device 20 is being worn by the user and that the distance between wearable computing device 20 and mobile computing device 10 is less than a threshold distance. Together, these indications can signify that both devices 10 and 20 are under control (e.g., physical control) of the user. In some examples, responsive to receiving the indications, one or both of access mode modules 16 and 26 can be operable to change the access mode of the computing environment provided by the computing device 10 or 20 in which the access mode module 16 or 26 is included from a reduced access mode to an increased access mode. In other examples, responsive to receiving the indications, one or both of access mode modules 16 and 26 can be operable to output a security challenge, e.g., to the corresponding UI module 14 or 24. In some examples, the security challenge includes a user interface screen (for display at the corresponding UI device 12 or 22) that prompts the user to input a security challenge response, such as a password, a PIN, a pattern, biometric data (e.g., fingerprint, voice, image, or the like), etc. Responsive to receiving the input security challenge response, the access mode module 16 or 26 that output the security challenge may verify the security challenge response against a stored security challenge response. Responsive to verifying the input security challenge response in view of the stored security challenge response, the access mode module 16 or 26 that output the security challenge can be operable to change the access mode of the computing environment provided by the computing device 10 or 20 in which the access mode module 16 or 26 is included from a reduced access mode to an increased access mode.

Additionally, in some examples, the access mode module 16 or 26 that output the security challenge can be operable to transmit, to the other device of computing devices 10 and 20, an instruction to change an access mode of a computing environment provided by the other one of computing devices 10 and 20 from a reduced access mode to an increased access mode. In other examples, e.g., in which both access mode modules 16 and 26 output a respective security challenge and receive a response to the respective security challenge, the respective access mode modules 16 and 26 can verify the respective security challenge response and change the access mode of the computing environment provided by the respective one of computing devices 10 and 20 based on the respective verification.

In this way, in some examples, the technique may be implemented solely by wearable computing device 20. In other words, in some examples, wearable computing device access mode module 26 can be operable to receive the indications of the wearable computing device 20 being worn (e.g., from sensor 34) and the distance between mobile computing device 10 and wearable computing device 20 being less than the threshold distance, and, in response to the indications, can be operable to output the security challenge. Responsive to receiving an input security challenge response, wearable computing device access mode module 26 can be operable to verify the security challenge response against a stored security challenge response. Responsive to verifying the input security challenge response in view of the stored security challenge response, wearable computing device access mode module 26 can be operable to change the access mode of the computing environment provided by wearable computing device 20 from the reduced access mode to the increased access mode. Additionally, wearable computing device access mode module 26 can be operable to transmit, to mobile computing device 10, an instruction to change an access mode of a computing environment provided by mobile computing device 10 from the reduced access mode to the increased access mode.

In other examples, the technique may be implemented solely by mobile computing device 10. In other examples, some steps of the technique may be implemented by mobile computing device 10 and other steps of the technique may be implemented by wearable computing device 20. In some examples, some steps of the technique (e.g., determining that the distance between the devices 10 and 20 is less than the threshold distance and outputting a security challenge) can be performed by both mobile computing device 10 and wearable computing device 20.

In some examples, the techniques of this disclosure can increase a security of wearable computing device 20 and/or mobile computing device 10, e.g., compared to a computing device that is configured to be controllable between a reduced access mode and an increased access mode based only on parameters associated with the single computing device. For example, the techniques can result in the devices 10 and 20 only being placed in the increased access mode when wearable computing device 20 is being worn, the distance between the devices 10 and 20 is less than a threshold distance, and one or both of the devices 10 and 20 receive security challenge responses that are verifiable against saved security challenge responses.

Figure 2:
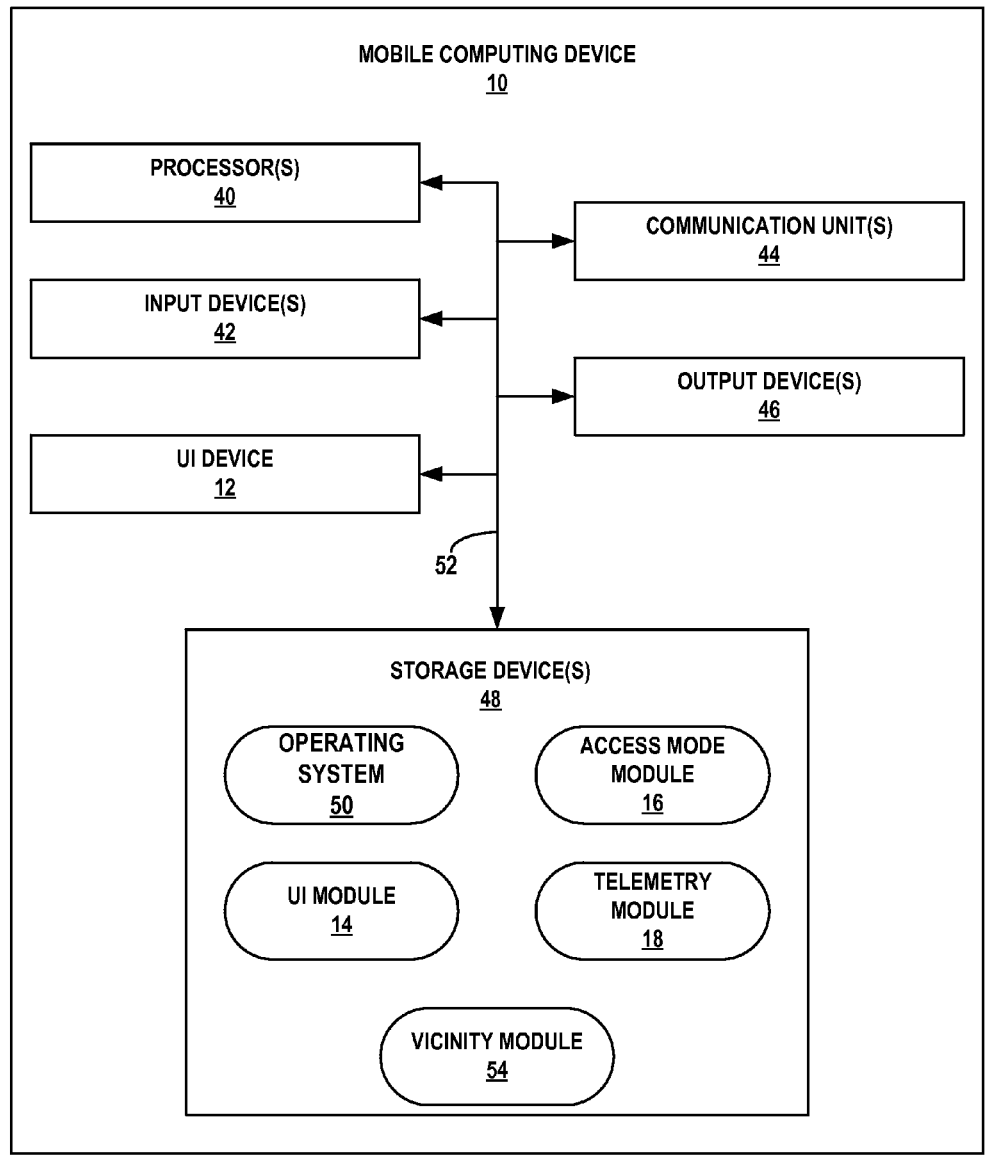
FIG. 2 is a block diagram illustrating further details of one example of a mobile computing device as shown in FIG. 1, in accordance with one or more techniques of the present disclosure.

FIG. 2 is a block diagram illustrating further details of one example of a mobile computing device 10 as shown in FIG. 1, in accordance with one or more techniques of the present disclosure. FIG. 2 illustrates only one particular example of mobile computing device 10 as shown in FIG. 1, and many other examples of mobile computing device 10 may be used in other instances.

As shown in the example of FIG. 2, mobile computing device 10 includes one or more processors 40, one or more input devices 42, one or more communication units 44, one or more output devices 46, one or more storage devices 48, and user interface (UI) device 12. In the example of FIG. 2, mobile computing device 10 further includes UI module 14, mobile computing device access mode module 16, telemetry module 18, vicinity module 54, and operating system 50, which are executable by one or more processors 40. Each of components 12, 40, 42, 44, 46, and 48 are coupled (physically, communicatively, and/or operatively) using communication channels 52 for inter-component communications. In some examples, communication channels 52 may include a system bus, a network connection, an inter-process communication data structure, or any other method for communicating data. UI module 14, mobile computing device access mode module 16, telemetry module 18, vicinity module 54, and operating system 50, may also communicate information with one another, as well as with other components in mobile computing device 10.

One or more processors 40, in one example, are configured to implement functionality and/or process instructions for execution within mobile computing device 10. For example, processors 40 may be capable of processing instructions stored by one or more storage devices 48. Examples of one or more processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within mobile computing device 10 during operation. Storage devices 48, in some examples, include a computer-readable storage medium or computer-readable storage device. In some examples, storage devices 48 include a temporary memory, meaning that a primary purpose of storage device 48 is not long-term storage. Storage devices 48, in some examples, include a volatile memory, meaning that storage device 48 does not maintain stored contents when power is not provided to storage device 48. Examples of volatile memories include random access memories (RAM), dynamic random access memories (DRAM), static random access memories (SRAM), and other forms of volatile memories known in the art. In some examples, storage devices 48 are used to store program instructions for execution by processors 40. Storage devices 48, in some examples, are used by software or applications running on mobile computing device 10 (e.g., mobile computing device access mode module 16) to temporarily store information during program execution.

In some examples, storage devices 48 may further include one or more storage device 48 configured for longer-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 10, in some examples, also includes one or more communication units 44. Mobile computing device 10, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, mobile computing device 10 utilizes communication unit 44 to wirelessly communicate with an external device such as wearable computing device 20. Communication unit 44 may be controlled by telemetry module 18.

Mobile computing device 1, in one example, also includes one or more input devices 42. Input device 42, in some examples, is configured to receive input from a user through tactile, audio, or video sources. Examples of input device 42 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 46 may also be included in mobile computing device 10. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), organic light emitting diode (OLED), or any other type of device that can generate intelligible output to a user. In some examples, UI device 12 may include functionality of one or more of input devices 42 and/or output devices 46.

Mobile computing device 10 also can include UI device 12. In some examples, UI device 12 is configured to receive tactile, audio, or visual input. In addition to receiving input from a user, UI device 12 can be configured to output content such as a GUI for display at a display device, such as a presence-sensitive display. In some examples, UI device 12 can include a presence-sensitive display that displays a GUI and receives input from a user using capacitive, inductive, and/or optical detection at or near the presence sensitive display. In some examples, UI device 12 is both one of input devices 44 and one of output devices 46.

In some examples, UI device 12 of mobile computing device 10 may include functionality of input devices 42 and/or output devices 46. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 46.

Mobile computing device 10 may include operating system 50. Operating system 50, in some examples, controls the operation of components of mobile computing device 10. For example, operating system 50, in one example, facilitates the communication of UI module 14 and mobile computing device access mode module 16 with processors 40, communication units 44, storage devices 48, input devices 42, and output devices 46. UI module 14, telemetry module, vicinity module 54, and mobile computing device access mode module 16 can each include program instructions and/or data that are executable by mobile computing device 10 (e.g., by one or more processors 40). As one example, UI module 14 can include instructions that cause mobile computing device 10 to perform one or more of the operations and actions described in the present disclosure.

In some examples, mobile computing device 10 can also include vicinity module 54. In other examples, mobile computing device 10 may not include vicinity module 54. Vicinity module 54 can be operable to determine that a distance between mobile computing device 10 and wearable computing device 20 (FIG. 1) is less than a threshold distance. In some examples, vicinity module 54 may determine whether the distance between mobile computing device 10 and wearable computing device 20 is less than the threshold distance based at least in part on whether mobile computing device 10 is within range to communicate with wearable computing device 20 using one or more communication units 44, e.g., via a direct communication protocol between mobile computing device 10 and wearable computing device 20, such as a Bluetooth or WiFi wireless network connection. For example, when mobile computing device 10 is able to establish a direct wireless communication connection with wearable computing device 20, vicinity module 54 can be operable to determine that the distance between mobile computing device 10 and wearable computing device 20 is less than the threshold distance.

In other examples, vicinity module 54 can be operable to determine an approximate distance between mobile computing device 10 and wearable computing device 20. For example, vicinity module 54 can be operable to estimate the distance between mobile computing device 10 and wearable computing device 20 based at least in part on a signal generated by one of devices 10 and 20 and received by the other of devices 10 and 20. The signal may include, for example, a wireless communication signal, an optical signal, an audible signal, etc.

For example, telemetry module 18 can be operable to transmit, to wearable computing device 20, using communication units 44, an instruction to generate the signal. Responsive to receiving the instruction, a component of wearable computing device 20 (e.g., telemetry module 28 and communication unit 68 (FIG. 3)), an optical signal generator (e.g., a light source), or an audible signal generator (e.g., a speaker) can generate the signal according to predetermined parameters, which may be stored at storage devices 48 (e.g., associated with vicinity module 54) or may be transmitted by telemetry module 28 and communication unit 68 of wearable computing device 20 to mobile computing device 10.

Mobile computing device 10 can include an appropriate sensor for detecting the signal generated by wearable computing device 20, such as one or more communications units 44, a camera, a microphone, etc. Vicinity module 54 can be operable to receive from the sensor, or determine based on a signal received from the sensor, a signal strength of the received signal, which may account for one or more properties of the sensor, e.g., an antenna configuration of one or more communication units 44. Based on the parameters of the transmitted signal, the strength of the received signal, and a mathematical relationship between signal strength and distance, vicinity module 54 can estimate the distance between mobile computing device 10 and wearable computing device 20.

In examples in which vicinity module 54 determines an approximate distance between mobile computing device 10 and wearable computing device 20, vicinity module 54 can be operable to determine whether the distance is less than a threshold distance. In some examples, the threshold distance can be a predefined value, e.g., a distance value determined by a manufacturer or programmer of mobile computing device 10 (and/or wearable computing device 20). In other examples, the threshold distance can be a user defined value, which vicinity module 54 (or mobile computing device access mode module 16) can be operable to allow the user to define, e.g., using a user interface screen output for display at UI device 12.

In some examples, the threshold distance may be selected to be a value that indicates that mobile computing device 10 and wearable computing device 20 are near each other, e.g., are sufficiently close that the user of devices 10 and 20 is likely to have possession of both devices 10 and 20 and/or is likely to have control of both devices 10 and 20. For example, the threshold distance may be selected to be a value that is approximately equal to a common room dimension (e.g., about 3 to 5 meters or about 9 to 15 feet). In other examples, the threshold distance may be selected to be lesser (e.g., less than about 3 meters) or greater (e.g., greater than about 5 meters, such as about 10 meters, about 15 meters, or about 20 meters).

Mobile computing device 10 can include additional components that, for clarity, are not shown in FIG. 2. For example, mobile computing device 10 can include a battery to provide power to the components of mobile computing device 10. Similarly, the components of mobile computing device 10 shown in FIG. 2 may not be necessary in every example of mobile computing device 10.

In accordance with one or more examples of the disclosure, mobile computing device access mode module 16 can be operable to control an access mode of a computing environment provided by mobile computing device 10, e.g., by one or more processors 40. For example, mobile computing device access mode module 16 can be operable to receive, from wearable computing device 20, an indication that the wearable computing device 20 is being worn by a user. Mobile computing device access mode module 16 can be operable to receive the indication from telemetry module 18, which can receive the indication from wearable computing device 20 using one or more communication units 44.

Additionally, mobile computing device access mode module 16 can be operable to receive an indication that a distance between mobile computing device 10 and wearable computing device 20 is less than a threshold distance. As described above, vicinity module 54 can be operable to determine that the threshold distance is less than the threshold distance based at least in part on a signal generated by one of devices 10 and 20 and received by the other of devices 10 and 20. In some examples, vicinity module 54 can be operable to determine an approximate distance between devices 10 and 20 and compare the approximate distance to the threshold distance. Responsive to determining that the distance between mobile computing device 10 and wearable computing device 20 is less than the threshold distance, vicinity module 54 can be operable to communicate an indication of that the distance between mobile computing device 10 and wearable computing device 20 is less than the threshold distance to mobile computing device access mode module 16. Alternatively or additionally, mobile computing device access mode module 16 can be operable to receive the indication that the distance between mobile computing device 10 and wearable computing device 20 is less than a threshold distance from wearable computing device 20, e.g., using one or more communication units 44.

In some examples, responsive to receiving the indications that wearable computing device 20 is being worn and the distance between mobile computing device 10 and wearable computing device 20 is less than the threshold distance, mobile computing device access mode module 16 can be operable to output a security challenge. The security challenge may include a user interface screen, output at UI device 12 by UI module 14, which prompts a user of mobile computing device 10 to input a security challenge response, such as a password, a PIN, a pattern, biometric data (e.g., fingerprint, voice, image, or the like), etc. Responsive to receiving the input security challenge response, mobile computing device access control module 16 can be operable to verify the security challenge response against a stored security challenge response (e.g., a security challenge response input by the user when setting up the security challenge). Responsive to verifying the input security challenge response in view of the stored security challenge response, mobile computing device access control module 16 can be operable to change the access mode of the computing environment provided by mobile computing device 10 (e.g., one or more processors 40) from the reduced access mode to the increased access mode. In some examples, mobile computing device access mode module 16 can also be operable to cause telemetry module 18 to transmit, using communications units 44 and to wearable computing device 20, an instruction to change an access mode of a computing environment provided by wearable computing device 20 from the reduced access mode to the increased access mode.

In other examples, instead of being operable to perform each of these steps, mobile computing device access mode module 16 can be operable to perform other functions. For example, instead of being operable to output the security challenge in response to receiving the indications that wearable computing device 20 is being worn and the devices 10 and 20 are within the threshold distance of each other, access mode module 16 may not be operable to receive any of the indications (e.g., of the wearable computing device 20 being worn, the devices 10 and 20 being within the threshold distance of each other, or of the response to the security challenge). Instead, in some examples, mobile computing device access mode module 16 can be operable to receive, from wearable computing device 20, an instruction to change the access mode of the computing environment provided by mobile computing device 10 from the reduced access mode to the increased access mode. Other examples of the steps of the techniques described herein being performed by mobile computing device 10, wearable computing device 20, or both are also possible and within the scope of this disclosure.

Figure 3:
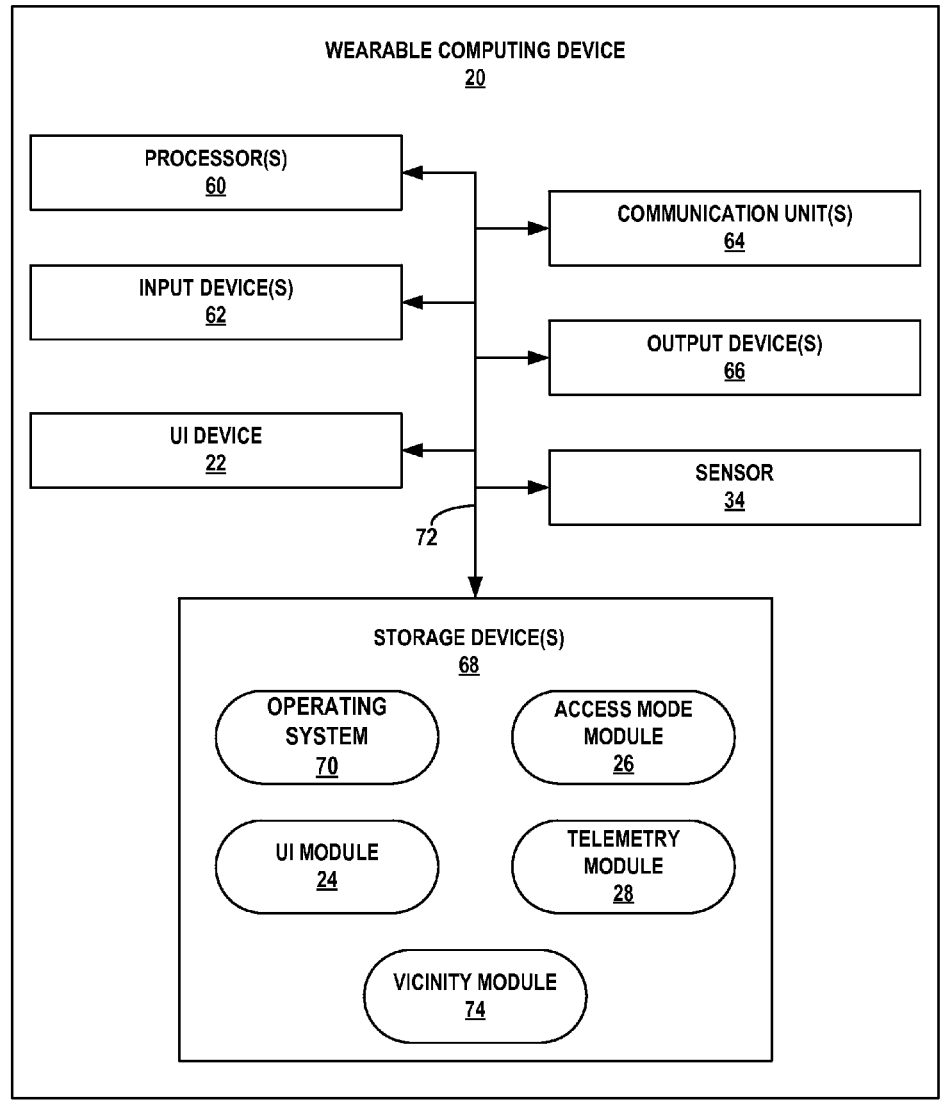
FIG. 3 is a block diagram illustrating further details of one example of a wearable computing device as shown in FIG. 1, in accordance with one or more techniques of the present disclosure.

FIG. 3 is a block diagram illustrating further details of one example of a wearable computing device as shown in FIG. 1, in accordance with one or more techniques of the present disclosure. FIG. 3 illustrates only one particular example of wearable computing device 20 as shown in FIG. 1, and many other examples of wearable computing device 20 may be used in other instances.

As shown in the example of FIG. 3, wearable computing device 20 includes one or more processors 60, one or more input devices 62, one or more communication units 64, one or more output devices 66, one or more storage devices 68, user interface (UI) device 22, and sensor 34. In the example of FIG. 3, wearable computing device 20 further includes UI module 24, wearable computing device access mode module 26, telemetry module 28, vicinity module 74, and operating system 70, which are executable by one or more processors 60. Each of components 22, 34, 60, 62, 64, 66, and 68 are coupled (physically, communicatively, and/or operatively) using communication channels 72 for inter-component communications. In some examples, communication channels 72 may include a system bus, a network connection, an inter-process communication data structure, or any other method for communicating data. UI module 24, wearable computing device access mode module 26, telemetry module 28, vicinity module 74, and operating system 70 may also communicate information with one another, as well as with other components in wearable computing device 20.

One or more processors 60, in one example, are configured to implement functionality and/or process instructions for execution within wearable computing device 20. For example, processors 60 may be capable of processing instructions stored by storage device 68. Examples of one or more processors 60 can include any one or more of a microprocessor, a controller, a DSP, an ASIC, a FPGA, or equivalent discrete or integrated logic circuitry.

One or more storage devices 68 may be configured to store information within wearable computing device 20 during operation. Storage devices 68, in some examples, include a computer-readable storage medium or computer-readable storage device. In some examples, storage devices 68 include a temporary memory, meaning that a primary purpose of storage device 68 is not long-term storage. Storage devices 68, in some examples, include a volatile memory, meaning that storage device 68 does not maintain stored contents when power is not provided to storage device 68. Examples of volatile memories include random access memories (RAM), dynamic random access memories (DRAM), static random access memories (SRAM), and other forms of volatile memories known in the art. In some examples, storage devices 68 are used to store program instructions for execution by processors 60. Storage devices 68, in some examples, are used by software or applications running on wearable computing device 20 (e.g., wearable computing device access mode module 26) to temporarily store information during program execution.

In some examples, storage devices 68 may further include one or more storage device 68 configured for longer-term storage of information. In some examples, storage devices 68 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Wearable computing device 20, in some examples, also includes one or more communication units 64. Wearable computing device 20, in one example, utilizes communication unit 64 to communicate with external devices via one or more networks, such as one or more wireless networks. Communication unit 64 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, wearable computing device 20 utilizes communication unit 64 to wirelessly communicate with an external device such as mobile computing device 10. Communication units 64 can be controlled by telemetry module 28.

Wearable computing device 20, in one example, also includes one or more input devices 62. Input device 62, in some examples, is configured to receive input from a user through tactile, audio, or video sources. Examples of input device 62 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 66 may also be included in wearable computing device 20. Output device 66, in some examples, is configured to provide output to a user using tactile, audio, or video stimuli. Output device 66, in one example, includes a presence-sensitive display, a sound card, a video graphics adapter card, or any other type of device for converting a signal into an appropriate form understandable to humans or machines. Additional examples of output device 66 include a speaker, a CRT monitor, a LCD, OLED, or any other type of device that can generate intelligible output to a user. In some examples, UI device 22 may include functionality of one or more of input devices 62 and/or output devices 66.

Wearable computing device 20 also can include UI device 22. In some examples, UI device 22 is configured to receive tactile, audio, or visual input. In addition to receiving input from a user, UI device 22 can be configured to output content such as a GUI for display at a display device, such as a presence-sensitive display. In some examples, UI device 22 can include a presence-sensitive display that displays a GUI and receives input from a user using capacitive, inductive, and/or optical detection at or near the presence sensitive display. In some examples, UI device 22 is both one of input devices 64 and one of output devices 66.

In some examples, UI device 22 of wearable computing device 20 may include functionality of input devices 62 and/or output devices 66. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 66.

Wearable computing device 20 may include operating system 70. Operating system 70, in some examples, controls the operation of components of wearable computing device 20. For example, operating system 70, in one example, facilitates the communication of UI module 24 and wearable computing device access mode module 26 with processors 60, communication units 64, storage devices 68, input devices 62, output devices 66, and sensor 34. UI module 24, wearable computing device access mode module 26, telemetry module 28, and vicinity module 74, can each include program instructions and/or data that are executable by wearable computing device 20 (e.g., by one or more processors 60). As one example, UI module 24 can include instructions that cause wearable computing device 20 to perform one or more of the operations and actions described in the present disclosure.

In some examples, wearable computing device 20 can also include a vicinity module 74. In other examples, wearable computing device 20 may not include vicinity module 74. Vicinity module 74 can be similar to or substantially the same as vicinity module 54 described with reference to FIG. 2. For example, vicinity module 74 can be operable by one or more processors 60 to determine that a distance between mobile computing device 10 and wearable computing device 20 (FIG. 1) is less than a threshold distance, e.g., based at least in part on a signal generated by one of devices 10 and 20 and received by the other of devices 10 and 20.

Sensor 34 can be configured to detect a parameter indicative of wearable computing device 20 being worn by a user, and generate an indication that wearable computing device 20 is being worn by the user. For example, sensor 34 can include a proximity sensor, such as an infrared proximity sensor; a capacitive sensor; a light sensor; a physical button or contact; etc. Sensor 34 may be configured to generate an indication (e.g., a signal) when wearable computing device 20 is being worn by a user. For example, sensor 34 can be configured to be adjacent to and facing a wrist of the user when the user is wearing wearable computing device 20, such that the proximity of the user's wrist to sensor 34 generates a signal indicative of wearable computing device 20 being worn by the user or causes sensor 34 to generate a signal indicative of wearable computing device 20 being worn by the user. Wearable computing device access module 26 can then receive the indication that wearable computing device 20 is being worn by the user.

Wearable computing device 20 can include additional components that, for clarity, are not shown in FIG. 3. For example, wearable computing device 20 can include a battery to provide power to the components of wearable computing device 20. Similarly, the components of wearable computing device 20 shown in FIG. 3 may not be necessary in every example of wearable computing device 20.

In accordance with one or more examples of the disclosure, wearable computing device access mode module 26 can be operable to control an access mode of a computing environment provided by wearable computing device 20, e.g., by one or more processors 60. For example, wearable computing device access mode module 26 can be operable to receive, from sensor 34, an indication that the wearable computing device 20 is being worn by a user.

Additionally, wearable computing device access mode module 26 can be operable to receive an indication that a distance between mobile computing device 10 and wearable computing device 20 is less than a threshold distance. As described above, in some examples, vicinity module 74 can be operable to determine that the threshold distance is less than the threshold distance based at least in part on a signal generated by one of devices 10 and 20 and received by the other of devices 10 and 20. In some examples, vicinity module 74 can be operable to determine an approximate distance between devices 10 and 20 and compare the approximate distance to the threshold distance.

Responsive to determining that the distance between mobile computing device 10 and wearable computing device 20 is less than the threshold distance, vicinity module 74 can be operable to communicate an indication of that the distance between mobile computing device 10 and wearable computing device 20 is less than the threshold distance to wearable computing device access mode module 26. Alternatively or additionally, wearable computing device access mode module 26 can be operable to receive the indication that the distance between mobile computing device 10 and wearable computing device 20 is less than a threshold distance from mobile computing device 10, e.g., using one or more communication units 64.

In some examples, responsive to receiving the indications that wearable computing device 20 is being worn and the distance between mobile computing device 10 and wearable computing device 20 is less than the threshold distance, wearable computing device access mode module 26 can be operable to output a security challenge. The security challenge may include a user interface screen, output at UI device 22 by UI module 24, which prompts a user of wearable computing device 20 to input a security challenge response, such as a password, a PIN, a pattern, biometric data (e.g., fingerprint, voice, image, or the like), etc.

Responsive to receiving the input security challenge response, wearable computing device access control module 26 can be operable to verify the security challenge response against a stored security challenge response (e.g., a security challenge response input by the user when setting up the security challenge). Responsive to verifying the input security challenge response in view of the stored security challenge response, wearable computing device access control module 26 can be operable to change the access mode of the computing environment provided by wearable computing device 20 (e.g., one or more processors 60) from the reduced access mode to the increased access mode. In some examples, wearable computing device access mode module 26 can also be operable to cause telemetry module 28 to transmit, using communications units 64 and to mobile computing device 10, an instruction to change an access mode of a computing environment provided by mobile computing device 10 from the reduced access mode to the increased access mode.

In other examples, instead of being operable to perform each of these steps, wearable computing device access mode module 26 can be operable to perform other functions. For example, instead of being operable to output the security challenge in response to receiving the indications that wearable computing device 20 is being worn and the devices 10 and 20 are within the threshold distance of each other, access mode module 26 may not be operable to receive any of the indications (e.g., of the wearable computing device 20 being worn, the devices 10 and 20 being within the threshold distance of each other, or of the response to the security challenge). Instead, in some examples, wearable computing device access mode module 26 can be operable to receive, from mobile computing device 10, an instruction to change the access mode of the computing environment provided by wearable computing device 20 from the reduced access mode to the increased access mode. Other examples of the steps of the technique being performed by mobile computing device 10, wearable computing device 20, or both are also possible and within the scope of this disclosure.

Figure 4:
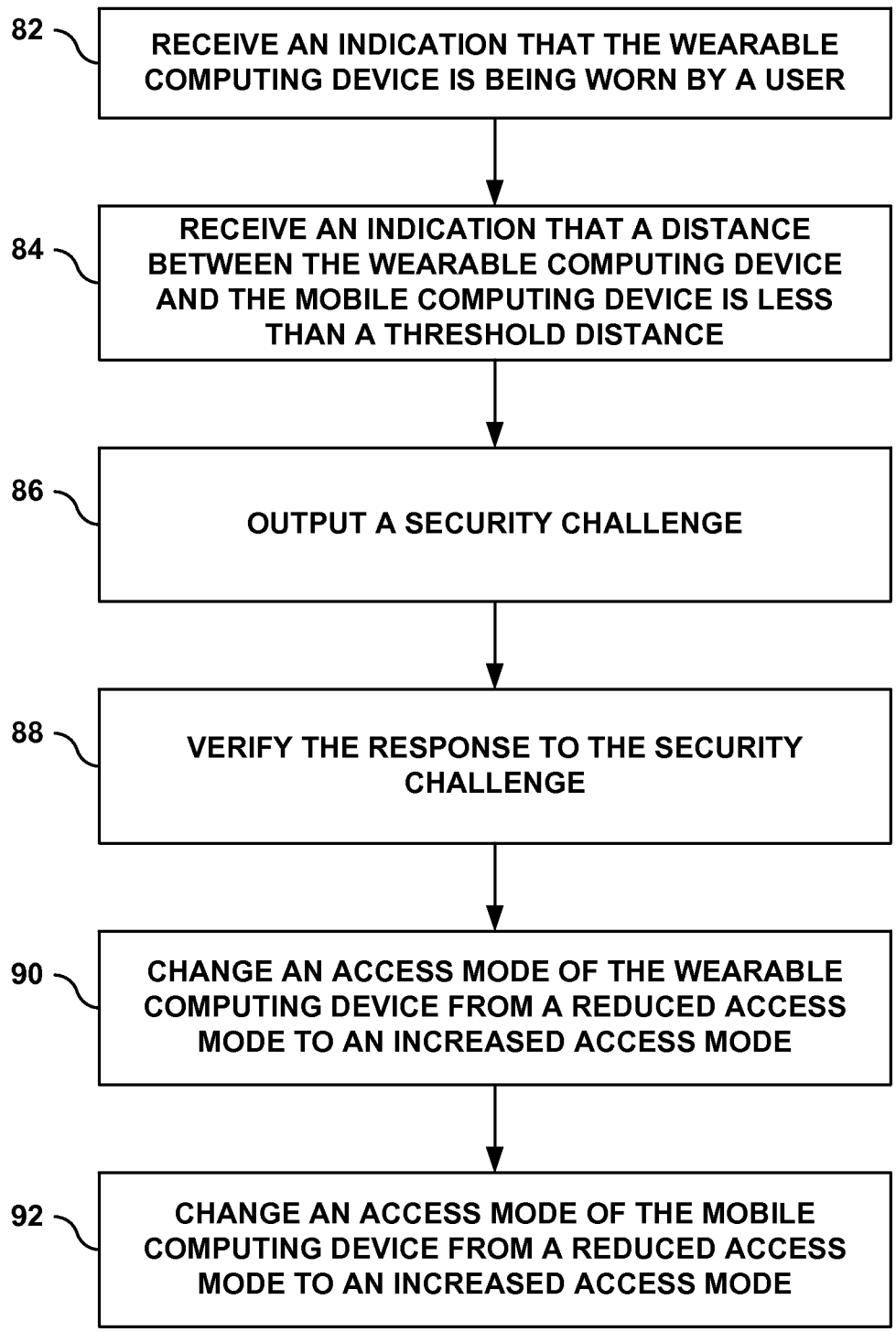
FIGS. 4-9 are flow diagrams illustrating example techniques for changing access modes of a mobile computing device and a wearable computing device based at least in part on indications that the wearable computing device being worn by a user and that the devices are within a threshold distance of each other, in accordance with one or more techniques of the present disclosure.

FIGS. 4-9 are flow diagrams illustrating example techniques for changing access modes of a mobile computing device and a wearable computing device based at least in part on indications that the wearable computing device being worn by a user and that the devices are within a threshold distance of each other, in accordance with one or more techniques of the present disclosure. The technique of FIG. 4 may be performed by one or more processors of a computing device, such as mobile computing device 10 illustrated in FIGS. 1 and 2 and wearable computing device 20 illustrated in FIGS. 1 and 3. For purposes of illustration, the technique of FIG. 4 is described below within the context of mobile computing device 10 and wearable computing device 20 of FIGS. 1-3, although the technique of FIG. 4 may be performed by computing devices having configurations different than that of mobile computing device 10 and wearable computing device 20.

The technique of FIG. 4 includes receiving an indication that the wearable computing device is being worn by a user (82). As described above, the indication may be received by, for example, mobile computing device access mode module 16 and/or wearable computing device access mode module 26. In examples in which mobile computing device access mode module 16 receives the indication, mobile computing device access mode module 16 may receive the indication from wearable computing device 20, e.g., using one or more communication units 44. In examples in which wearable computing device access mode module 26 receives the indication, wearable computing device access mode module 26 may receive the indication from sensor 34.

The technique of FIG. 4 also can include receiving an indication that a distance between wearable computing device 20 and mobile computing device 10 is less than a threshold distance (84). In some examples, mobile computing device access mode module 16 can receive the indication from vicinity module 54. In other examples, mobile computing device access mode module 16 can receive the indication from wearable computing device 20, e.g., using one or more communication units 44. Additionally or alternatively, wearable computing device access mode module 26 can receive the indication from vicinity module 74, or can receive the indication from mobile computing device 10, e.g., using one or more communication units 64. In this way, one or both of access mode modules 16 and 26 can receive the indication that the distance between wearable computing device 20 and mobile computing device 10 is less than the threshold distance (84).

In some examples, the technique of FIG. 4 also includes outputting a security challenge (86). One or both of mobile computing device 10 and wearable computing device 20 can output the security challenge. For example, wearable computing device access mode module 26 can output, for display at UI device 22, a security challenge, and/or mobile computing device access mode module 16 can output, for display at UI device 12, a security challenge.

In some examples, access mode modules 16 and/or 26 can output the security challenge in response to receiving the indications that wearable computing device 20 is being worn by a user and a distance between mobile computing device 10 and wearable computing device 20 is less than a threshold distance. In other examples, instead of receiving the two indications, one of access mode module 16 or 26 may receive an instruction to output the security challenge from the other of access mode module 16 or 26. The other of access mode module 16 or 26 may have received the two indications, and can be operable to transmit, using respective communication units 44 or 64, the instruction.

Whichever of access mode modules 16 and/or 26 that outputs the security challenge can also receive an indication of a response to the security challenge, e.g., from the corresponding UI module 14 and/or 24. Responsive to receiving the response to the security challenge, the access mode module 16 and/or 26 can be operable to verify the response to the security challenge against a stored response to the security challenge (88).

Responsive to verifying the response to the security challenge, wearable computing device access mode module 26 can change an access mode of a computing environment provided by wearable computing device 20 from a reduced access mode to an increased access mode (90). Similarly, responsive to verifying the response to the security challenge, mobile computing device access mode module 16 can change an access mode of a computing environment provided by mobile computing device 10 from a reduced access mode to an increased access mode. In examples in which only one of access mode module 16 or 26 outputs the security challenge (86) and verifies the response to the security challenge (88), the one of access mode module 16 or 26 can transmit, using the corresponding communication units 44 or 64, an indication to the other of access mode module 16 or 26 that the other of access mode module 16 or 26 is to change the access mode of the corresponding device. In response to receiving this indication, the other of access mode module 16 or 26 can be operable to change the access mode of a computing environment provided by the corresponding device from a reduced access mode to an increased access mode.

Figure 5:
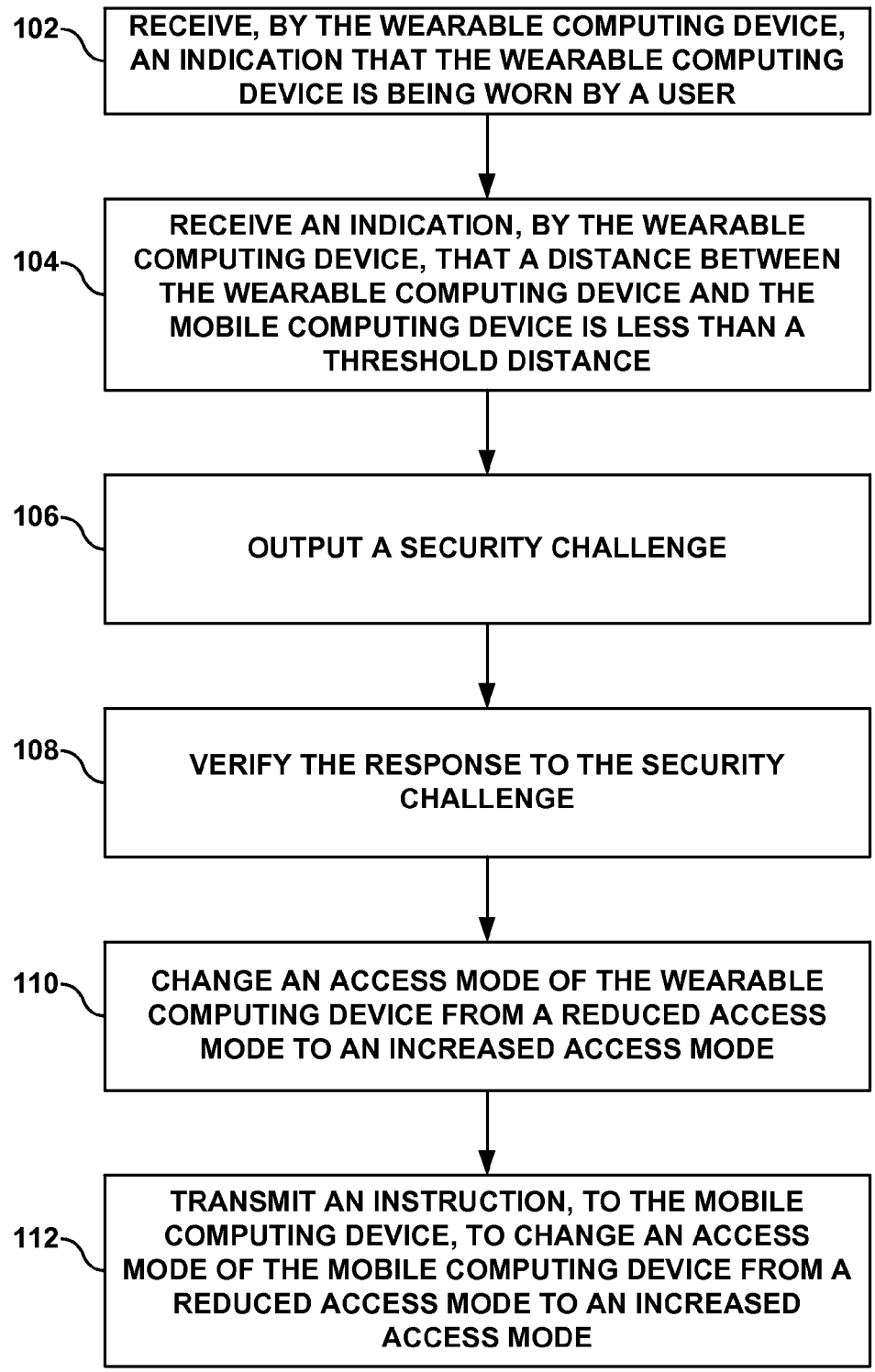

Hence, each of steps (82)-(92) may be performed by one or both of mobile computing device 10 and wearable computing device 20, in any combination. However, in some examples, most or all of the steps of the techniques described herein may be performed by one of mobile computing device 10 or wearable computing device 20. FIG. 5 is a flow diagram of an example technique for changing access modes of a mobile computing device and a wearable computing device based at least in part on indications that the wearable computing device being worn by a user and that the devices are within a threshold distance of each other, which may be performed primarily by wearable computing device 20. The technique of FIG. 5 may be performed by one or more processors of a computing device, such as wearable computing device 20 illustrated in FIGS. 1 and 3. For purposes of illustration, the technique of FIG. 5 is described below within the context of wearable computing device 20 of FIGS. 1 and 3, although the technique of FIG. 5 may be performed by computing devices having configurations different than that of wearable computing device 20.

The technique of FIG. 5 includes receiving, by one or more processors 60 of wearable computing device 20, an indication of that wearable computing device 20 is being worn by a user (102). As described above, one or more processors 60 may receive the indication from sensor 34.

The technique of FIG. 5 also includes receiving an indication, by one or more processors 60 of wearable computing device 20, that a distance between wearable computing device 20 and the mobile computing device 10 is less than a threshold distance (104). In some examples, one or more processors 60 of wearable computing device 20 can receive the indication from mobile computing device 10, e.g., using one or more communication units 64.

The technique of FIG. 5 also can include outputting, by one or more processors 60 of wearable computing device 20, a security challenge (106). For example, one or more processors 60 of wearable computing device 20 can output, for display at UI device 22, a security challenge. In some examples, one or more processors 60 of wearable computing device 20 can output the security challenge in response to receiving the indications that wearable computing device 20 is being worn by a user (102) and the distance between mobile computing device 10 and wearable computing device 20 is less than the threshold distance. (102). Additionally, the technique of FIG. 5 can include verifying the response to the security challenge against a saved security challenge response (108).

The technique of FIG. 5 also can include changing, by one or more processors 60 of wearable computing device 20, an access mode of a computing environment provided by one or more processors 60 from a reduced access mode to an increased access mode (110). Finally, the technique of FIG. 5 can include transmitting, by one or more processors 60 of wearable computing device 20, to one or more processors 40 of mobile computing device 10, an instruction to change an access mode provided by one or more processors from a reduced access mode to an increased access mode (112). In this way, the technique of FIG. 5 is performed by one or more processors 60 of wearable computing device 20.

Figure 6:
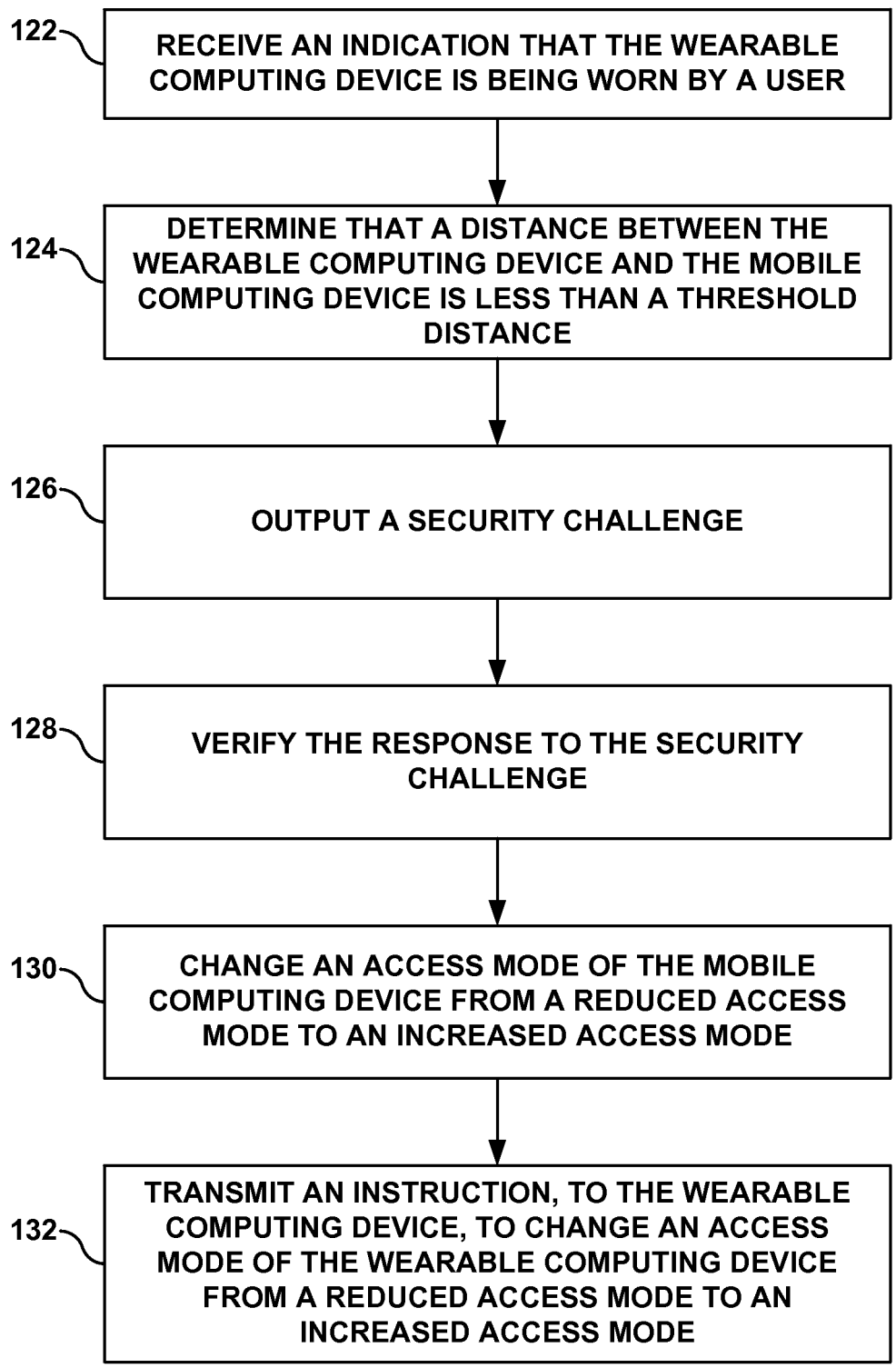

In other examples, a technique may be performed by mobile computing device 10, e.g., one or more processors 40 of mobile computing device 10. FIG. 6 is an flow diagram of an example technique for changing access modes of a mobile computing device and a wearable computing device based at least in part on indications that the wearable computing device being worn by a user and that the devices are within a threshold distance of each other, which may be performed primarily by mobile computing device 20. The technique of FIG. 6 may be performed by one or more processors of a computing device, such as mobile computing device 10 illustrated in FIGS. 1 and 2. For purposes of illustration, the technique of FIG. 6 is described below within the context of mobile computing device 10 of FIGS. 1 and 2, although the technique of FIG. 6 may be performed by computing devices having configurations different than that of mobile computing device 10.

The technique of FIG. 6 includes receiving, by one or more processors 40 of mobile computing device 10, an indication of that wearable computing device 20 is being worn by a user (122). As described above, one or more processors 40 of mobile computing device 10 can receive the indication from one or more processors 60 of wearable computing device 20, e.g., using communication units 44 and 64.

The technique of FIG. 6 also includes determining, by one or more processors 40 of mobile computing device 10, that a distance between wearable computing device 20 and mobile computing device 10 is less than a threshold distance (124). As described above, one or more processors 40 (e.g., operable to execute vicinity module 54) can determine whether the distance between wearable computing device 20 and mobile computing device 10 is less than a threshold distance (124) based at least in part on whether mobile computing device 10 is within range to communicate with wearable computing device 20 using one or more communication units 44, e.g., via a direct communication protocol between mobile computing device 10 and wearable computing device 20, such as a Bluetooth or WiFi wireless network connection. For example, when mobile computing device 10 is able to establish a direct wireless communication connection with wearable computing device 20, one or more processors 40 can be operable to determine that the distance between mobile computing device 10 and wearable computing device 20 is less than the threshold distance. In other examples, one or more processors 40 can be operable to determine an approximate distance between mobile computing device 10 and wearable computing device 20. For example, one or more processors 40 can be operable to estimate the distance between mobile computing device 10 and wearable computing device 20 based at least in part on a signal generated by one of devices 10 and 20 and received by the other of devices 10 and 20

The technique of FIG. 5 also can include outputting, by one or more processors 40 of mobile computing device 10, a security challenge (126). For example, one or more processors 40 of mobile computing device 10 can output, for display at UI device 12, a security challenge. In some examples, one or more processors 40 of mobile computing device 10 can output the security challenge in response to receiving the indication that wearable computing device 20 is being worn by a user (126) and determining that the distance between mobile computing device 10 and wearable computing device 20 is less than the threshold distance. (124). Additionally, the technique of FIG. 5 can include verifying the response to the security challenge against a saved security challenge response (128).

The technique of FIG. 6 also can include changing, by one or more processors 40 of mobile computing device 10, an access mode of a computing environment provided by one or more processors 40 from a reduced access mode to an increased access mode (130). Finally, the technique of FIG. 6 can include transmitting, by one or more processors 40 of mobile computing device 10, to one or more processors 60 of wearable computing device 20, an instruction to change an access mode provided by one or more processors from a reduced access mode to an increased access mode (132). In this way, the technique of FIG. 6 is performed by one or more processors 40 of mobile computing device 10.

Figure 7:
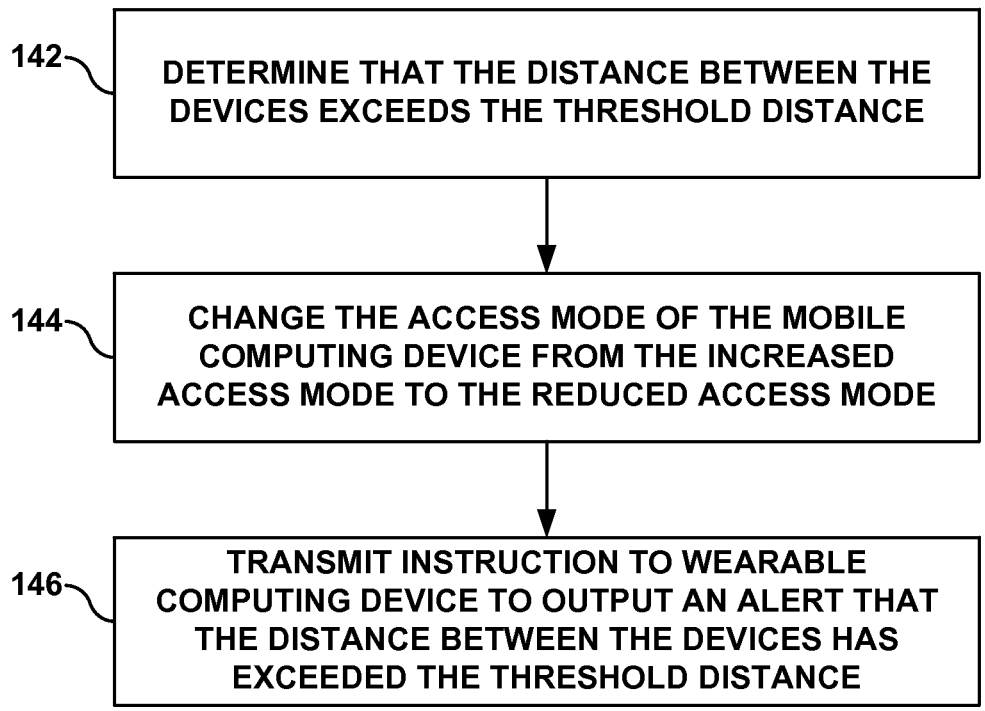

In some examples, the techniques described herein may include additional steps, such as steps performed by one or more processors 40 of mobile computing device 10 and/or one or more processors 60 of wearable computing device 20 to change, based at least in part on occurrence of one or more predefined events, an access mode provided by one or more processors 40 and/or one or more processors 60 from the increased access mode to the reduced access mode. FIG. 7 is a flow diagram illustrating an example technique performed by one or more processors 40 of mobile computing device 10 and/or one or more processors 60 of wearable computing device 20 in response to receiving an indication of the distance between the devices 10 and 20 exceeds the threshold distance.

At the beginning of the technique of FIG. 7, both mobile computing device 10 and wearable computing device 20 are operating in increased access modes, i.e., are not operating in the reduced access mode. Because mobile computing device 10 and wearable computing device 20 are operating in increased access modes, wearable computing device 20 is being worn by the user and the threshold distance between wearable computing device 20 and mobile computing device 10 is less than the threshold distance. The technique of FIG. 7 includes determining that the distance between mobile computing device 10 and wearable computing device 20 exceeds (is greater than) the threshold distance (142). As described above, either or both of one or more processors 40 and one or more processors 60 may determine whether the distance between mobile computing device 10 and wearable computing device 20 is less than or greater than the threshold distance. For purposes of explanation only, in the example of FIG. 7, one or more processors 40 of mobile computing device 10 determines that the distance between mobile computing device 10 and wearable computing device 20 exceeds (is greater than) the threshold distance (142).

In some examples, one or more processors 40 can be configured to execute instructions associated with vicinity module 54 (FIG. 2). Hence, one or more processors 40 can be configured to determine that the distance exceeds the threshold distance based at least in part on whether mobile computing device 10 is within range to communicate with wearable computing device 20 using one or more communication units 44, e.g., via a direct communication protocol between mobile computing device 10 and wearable computing device 20, such as a Bluetooth or WiFi wireless network connection. For example, when mobile computing device 10 is unable to establish a direct wireless communication connection with wearable computing device 20, one or more processors 40 can be configured to determine that the distance between mobile computing device 10 and wearable computing device 20 exceeds the threshold distance (142).

In other examples, one or more processors 40 can be configured to determine an approximate distance between mobile computing device 10 and wearable computing device 20. For example, one or more processors 40 can be operable to estimate the distance between mobile computing device 10 and wearable computing device 20 based at least in part on a signal generated by one of devices 10 and 20 and received by the other of devices 10 and 20. The signal may include, for example, a wireless communication signal, an optical signal, an audible signal, etc., as described above. One or more processors 40 can then compare the estimated distance between mobile computing device 10 and wearable computing device 20 to a threshold distance and determine whether the estimated distance is less than or greater than the estimated distance.

In some examples, the threshold distance can be a predefined value, e.g., a distance value determined by a manufacturer or programmer of mobile computing device 10 (and/or wearable computing device 20). In other examples, the threshold distance can be a user defined value, which one or more processors 40 can be operable to allow the user to define, e.g., using a user interface screen output for display at UI device 12. In some examples, the threshold distance may be selected to be a value that indicates that mobile computing device 10 and wearable computing device 20 are near each other, e.g., are sufficiently close that the user of devices 10 and 20 is likely to have possession of both devices 10 and 20 and/or is likely to have control of both devices 10 and 20. For example, the threshold distance may be selected to be a value that is approximately equal to a common room dimension (e.g., about 3 to 5 meters or about 9 to 15 feet). In other examples, the threshold distance may be selected to be lesser (e.g., less than about 3 meters) or greater (e.g., greater than about 5 meters, such as about 10 meters, about 15 meters, or about 20 meters).

In instances in which one or more processors 40 determines that the distance between mobile computing device 10 and wearable computing device 20 exceeds the threshold distance, one or more processors 40 can be configured to change the access mode of the computing environment provided by one or more processors 40 from the increased access mode to the reduced access mode (144). One or more processors 40 can be configured this way because, while wearable computing device 20 remains worn by the user, a distance between mobile computing device 10 and wearable computing device 20 being greater than the threshold distance indicates that the user is at least this distance from the mobile computing device 10. Hence, changing the access mode of the computing environment provided by one or more processors 40 from the increased access mode to the reduced access mode (144) when the distance between mobile computing device 10 and wearable computing device 20 exceeds the threshold distance (142) may increase security of mobile computing device 10.

Additionally, in some examples, the technique of FIG. 7 includes transmitting, by one or more processors 40, to one or more processors 60 of wearable computing device 20, an instruction to output an alert that the distance between mobile computing device 10 and wearable computing device 20 exceeds the threshold distance (146). One or more processors 40 can transmit the instruction using one or more communication units 44, and one or more processors 60 of wearable computing device 60 can receive the instruction using one or more communication units 64. In some examples, because mobile computing device 10 and wearable computing device 20 may not be able to connect using a direct device communication protocol, one or more processors 40 can be configured to cause one or more communication units 44 to transmit the instruction using a different communication protocol, e.g., an internet-based communication protocol.

One or more processors 60 can be configured to receive the instruction and to output the alert that the distance between mobile computing device 10 and wearable computing device 20 exceeds the threshold distance. One or more processors 60 can be configured to output one or more of, e.g., a visual alert for display at UI device 22, an audible alert for output by one or more output devices 66, a haptic alert for output by one or more output devices 66, etc. In some examples, the alert may include a textual or audible indication that the distance between mobile computing device 10 and wearable computing device 20 exceeds the threshold distance, e.g., a reminder to the user that he or she has left his or her mobile computing device 10. In this way, the alert may notify the user about leaving mobile computing device 10, and, in some examples, prompt the user to retrieve mobile computing device 10.

Figure 8:
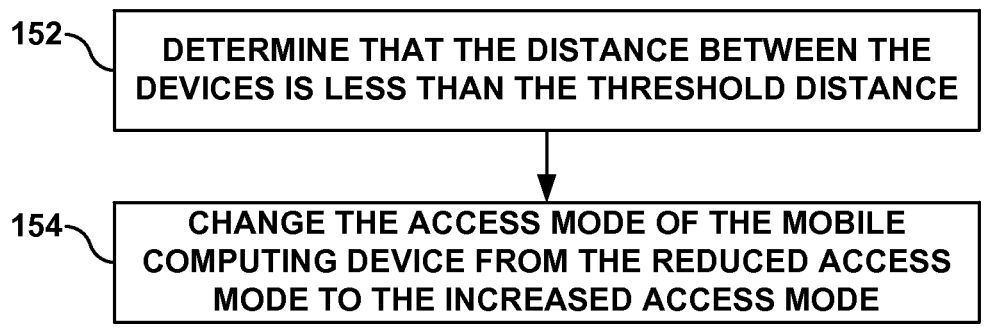

FIG. 8 is a flow diagram illustrating an example technique performed by one or more processors 40 of mobile computing device 10 and/or one or more processors 60 of wearable computing device 20 in response to receiving an indication of the distance between the devices 10 and 20 is less the threshold distance, e.g., after determining that the distance between mobile computing device 10 and wearable computing device 20 exceeds the threshold distance. For example, the technique of FIG. 8 can be implemented by one or more processors 40 of mobile computing device 10 and/or one or more processors 60 of wearable computing device 20 upon the user retrieving mobile computing device 10 at the end of the technique of FIG. 7.

At the beginning of the technique of FIG. 8, wearable computing device 20 is operating in the increased access mode, and mobile computing device 10 is operating in the reduced access mode. Additionally, wearable computing device 20 is being worn by the user. The technique of FIG. 8 includes determining that the distance between mobile computing device 10 and wearable computing device 20 is less than the threshold distance (152). As described above, either or both of one or more processors 40 and one or more processors 60 may determine whether the distance between mobile computing device 10 and wearable computing device 20 is less than or greater than the threshold distance. For purposes of explanation only, in the example of FIG. 8, one or more processors 40 of mobile computing device 10 determines that the distance between mobile computing device 10 and wearable computing device 20 is less than the threshold distance (152).

In some examples, one or more processors 40 can be configured to execute instructions associated with vicinity module 54 (FIG. 2). Hence, one or more processors 40 can be configured to determine that the distance exceeds the threshold distance based at least in part on whether mobile computing device 10 is within range to communicate with wearable computing device 20 using one or more communication units 44, e.g., via a direct communication protocol between mobile computing device 10 and wearable computing device 20, such as a Bluetooth or WiFi wireless network connection. For example, when mobile computing device 10 is able to establish a direct wireless communication connection with wearable computing device 20, one or more processors 40 can be configured to determine that the distance between mobile computing device 10 and wearable computing device 20 is less than the threshold distance (152).

In other examples, one or more processors 40 can be configured to determine an approximate distance between mobile computing device 10 and wearable computing device 20. For example, one or more processors 40 can be operable to estimate the distance between mobile computing device 10 and wearable computing device 20 based at least in part on a signal generated by one of devices 10 and 20 and received by the other of devices 10 and 20. The signal may include, for example, a wireless communication signal, an optical signal, an audible signal, etc., as described above. One or more processors 40 can then compare the estimated distance between mobile computing device 10 and wearable computing device 20 to a threshold distance and determine whether the estimated distance is less than or greater than the estimated distance.

In instances in which one or more processors 40 determines that the distance between mobile computing device 10 and wearable computing device 20 is less than the threshold distance (e.g., as the user approaches mobile computing device 10, bringing wearable computing device 20 closer to mobile computing device 10), one or more processors 40 can be configured to change the access mode of the computing environment provided by one or more processors 40 from the reduced access mode to the increased access mode (134). In some examples, one or more processors 40 can be configured to change the access mode automatically, i.e., without user intervention, in response to determining that the distance between mobile computing device 10 and wearable computing device 20 is less than the threshold distance (152). Because mobile computing device 10 and wearable computing device 20 were previously both operating in the increased access modes (e.g., prior to one or more processors determining that the distance between mobile computing device 10 and wearable computing device 20 was greater than the threshold distance (142; FIG. 7)), and wearable computing device 20 has continued to be worn by the user, changing the access mode of mobile computing device 10 to the increased access mode in response in response to determining that the distance between mobile computing device 10 and wearable computing device 20 is less than the threshold distance (152) may be convenient for the user and may not significantly decrease the security of mobile computing device 10.

Figure 9:
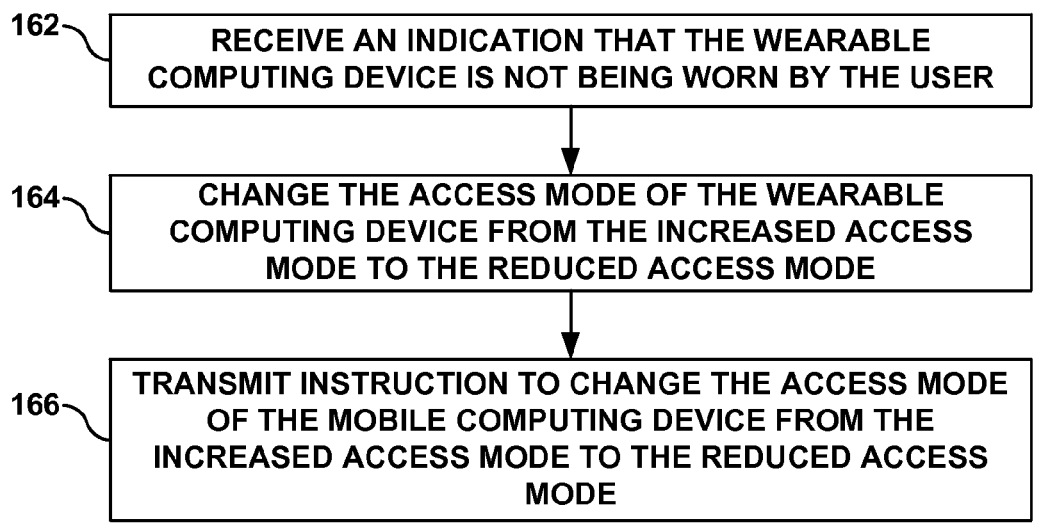

FIG. 9 is a flow diagram that illustrates a technique that one or more processors 40 and/or one or more processors 60 can be configured to execute upon receiving an indication that wearable computing device 20 is not being worn by the user. Prior to the technique of FIG. 9, wearable computing device 20 is being worn by a user and is operating in the increased access mode. Additionally, mobile computing device 10 is less than the threshold distance from wearable computing device 10 and is operating in the increased access mode. For purposes of illustration, the technique of FIG. 9 will be described as being performed by one or more processors 60 of mobile computing device. In some examples, however, one or more of the steps of FIG. 9 can be performed by one or more processors 40 of mobile computing device 10.

The technique of FIG. 9 includes receiving, by one or more processors 60, an indication that wearable computing device 20 is not being worn by the user (162). As described above, sensor 34 can be configured to detect a parameter indicative of wearable computing device 20 being worn by a user, and generate an indication that wearable computing device 20 is being worn by the user. For example, sensor 34 can include a proximity sensor, such as an infrared proximity sensor; a capacitive sensor; a light sensor; a physical button or contact; etc.

Additionally, upon no longer detecting the parameter indicative of wearable computing device 20 being worn by the user, sensor 34 can be configured to generate an indication (e.g., a signal) that wearable computing device 20 is not being worn by a user. One or more processors 60 can receiving this indication.

Responsive to receiving the indication that wearable computing device 20 is not being worn by the user (162), one or more processors 60 can be configured to change the access mode of the computing environment provided by one or more processors 60 from the increased access mode to the reduced access mode (164). This may provide security to wearable computing device 20, because any subsequent interaction with wearable computing device 20 will require the user to respond to a security challenge.

Additionally, one or more processors 60 can be configured to transmit an instruction, to one or more processors 40 of mobile computing device 10, to change the access mode provided by one or more processors 40 from the increased access mode to the reduced access mode (166). One or more processors 60 can transmit the instruction using one or more communication units 64, and one or more processors 40 of mobile computing device 10 can receive the instruction using one or more communication units 44. Upon receiving the instruction, one or more processors 40 of mobile computing device 10 can be configured to change the access mode provided by one or more processors 40 from the increased access mode to the reduced access mode. Hence, when wearable computing device 20 is not being worn by the user, both mobile computing device 10 and wearable computing device 20 may operate in the reduced access modes, and a user or either device may be required to respond to a security challenge presented by the respective device to interact with the respective device in the increased access mode.

Clause 1. A method comprising: receiving, by a processor of a wearable computing device and from a sensor, an indication that the wearable computing device is being worn by a user; responsive to receiving the indication that the wearable computing device is being worn by the user and based at least in part on an indication that a distance between the wearable computing device and a mobile computing device is less than a threshold distance, outputting, by the processor of the wearable computing device, a security challenge; changing, by the processor of the wearable computing device, based at least in part on the indications that the wearable computing device is being worn and that the distance is less than the threshold distance, an access mode of a computing environment provided by the wearable computing device from a reduced access mode to an increased access mode; and transmitting, by the wearable computing device, to the mobile computing device, an instruction to change an access mode of a computing environment provided by the mobile computing device from a reduced access mode to an increased access mode.

Clause 2. The method of clause 1, further comprising determining, by the processor of the wearable computing device, that the distance between the wearable computing device and the mobile computing device is less than the threshold distance.

Clause 3. The method of clause 2, wherein determining that the distance between the wearable computing device and the mobile computing device is less than the threshold distance comprises: receiving, by the processor of the wearable computing device, an indication of a wireless communication link between the wearable computing device and the mobile computing device; responsive to receiving the indication of the wireless communication link, determining, based on a signal strength of the wireless communication link, an approximate distance between the wearable computing device and the mobile computing device; and comparing the approximate distance between the wearable computing device and the mobile computing device to the threshold distance.

Clause 4. The method of clause 2, wherein determining that the distance between the wearable computing device and the mobile computing device is less than the threshold distance comprises receiving, by the processor of the wearable computing device, an indication of a wireless communication link between the wearable computing device and the mobile computing device.

Clause 5. The method of clause 1, further comprising receiving, by the processor of the wearable computing device, from the mobile computing device, the indication that the distance between the wearable computing device and the mobile computing device is less than the threshold distance.

Clause 6. The method of any of clauses 1 to 5, wherein the sensor comprises at least one of a proximity sensor, an infrared sensor, a camera, a physical contact on a connecting structure of the wearable computing device, an electrical contact on a connecting structure of the wearable computing device, and a pressure sensor.

Clause 7. The method of any of clauses 1 to 6, further comprising: receiving, by the processor of the wearable computing device, an indication of a response to the security challenge, and wherein changing, based at least in part on the indications that the wearable computing device is being worn and that the distance is less than the threshold distance, the access mode of the computing environment provided by the wearable computing device from the reduced access mode to the increased access mode comprises changing, based at least in part on the indications that the wearable computing device is being worn, that the distance is less than the threshold distance, and of the response to the security challenge, the access mode of the computing environment provided by the wearable computing device from the reduced access mode to the increased access mode.

Clause 8. The method of any of clauses 1 to 7, further comprising: after changing the access mode of the computing environment provided by the wearable computing device, receiving, by the processor of the wearable computing device, an indication that the distance between the mobile computing device and the wearable computing device exceeds the threshold distance; and responsive to receiving the indication that the distance between the mobile computing device and the wearable computing device exceeds the threshold distance, transmitting, by the processor of the wearable computing device, to the mobile computing device, an instruction to change the access mode of the computing environment provided by the mobile computing device from the increased access mode to the reduced access mode.

Clause 9. The method of clause 8, further comprising outputting, by the processor of the wearable computing device, an alert that the distance between the mobile computing device and the wearable computing device has exceeded the threshold distance.

Clause 10. The method of any of clauses 1 to 9, further comprising: after changing the access mode of the computing environment provided by the wearable computing device, receiving, by the processor of the wearable computing device, an indication that the wearable computing device is not being worn by the user of the wearable computing device; and responsive to receiving the indication that the wearable computing device is not being worn by the user, changing, by the processor of the wearable computing device, the access mode of the computing environment provided by the wearable computing device from the increased access mode to the reduced access mode, and transmitting, by the processor of the wearable computing device, to the mobile computing device, an instruction to change the access mode of the computing environment provided by the mobile computing device from the increased access mode to the reduced access mode.

Clause 11. A system comprising: a mobile computing device comprising one or more mobile computing device processors; a wearable computing device comprising one or more wearable computing device processors and a sensor, wherein the sensor is configured to generate an indication that the wearable computing device is being worn by a user; a mobile computing device access mode module operable by the one or more mobile computing device processors to receive the indication that the wearable computing device is being worn by the user and change, based at least in part on the indication that the wearable computing device is being worn by the user and an indication that a distance between the wearable computing device and the mobile computing device is less than a threshold distance, an access mode of a computing environment provided by the mobile computing device from a reduced access mode to an increased access mode; and a wearable computing device access mode module operable by the one or more wearable computing device processors to receive the indication that the wearable computing device is being worn by the user and change, based at least in part on the indication that the wearable computing device is being worn by the user and the indication that the distance between the wearable computing device and the mobile computing device is less than the threshold distance, an access mode of a computing environment provided by the wearable computing device from a reduced access mode to an increased access mode.

Clause 12. The system of clause 11, further comprising a vicinity module operable by at least one processor of the one or more wearable computing device processors and the one or more mobile computing device processors to determine that a distance between the wearable computing device and the mobile computing device is less than a threshold distance and generate the indication that the distance between the wearable computing device and the mobile computing device is less than the threshold distance.

Clause 13. The system of clause 12, wherein the vicinity module is operable by the at least one processor of the one or more wearable computing device processors and the one or more mobile computing device processors to: receive an indication of a wireless communication link between the wearable computing device and the mobile computing device; responsive to receiving the indication of the wireless communication link, determine, based on a signal strength of the wireless communication link, an approximate distance between the wearable computing device and the mobile computing device; and compare the approximate distance between the wearable computing device and the mobile computing device to the threshold distance.

Clause 14. The system of any of clauses 11 to 13, wherein the mobile computing device access mode module is further operable by the one or more mobile computing device processors to: responsive to receiving the indications that the wearable computing device is being worn by the user and the distance between the wearable computing device and the mobile computing device is less than the threshold distance, output a security challenge; receive an indication of a response to the security challenge; verify the response to the security challenge against a saved security challenge response; change, based at least in part on the indications that the wearable computing device is being worn by the user and the distance between the wearable computing device, that the mobile computing device is less than the threshold distance, and of the response to the security challenge, the access mode of the computing environment provided by the mobile computing device from the reduced access mode to the increased access mode; and transmit, responsive to receiving the indications that the wearable computing device is being worn by the user and the distance between the wearable computing device, that the mobile computing device is less than the threshold distance, and of the response to the security challenge, to the wearable computing device, an instruction to change the access mode of the computing environment provided by the wearable computing device from the reduced access mode to the increased access mode.

Clause 15. The system of any of clauses 11 to 14, wherein the sensor comprises at least one of a proximity sensor, an infrared sensor, a camera, a physical contact on a connecting structure of the wearable computing device, an electrical contact on a connecting structure of the wearable computing device, and a pressure sensor.

Clause 16. The system of any of clauses 11 to 15, further comprising a telemetry module operable by at least one of processor of the one or more mobile computing device processors and the one or more mobile computing device processors to, prior to the vicinity module determining that the distance between the wearable computing device and the mobile computing device is less than the threshold distance, establish a wireless communication link between the wearable computing device and the mobile computing device.

Clause 17. The system of any of clauses 11 to 16, wherein the mobile computing device access mode module is operable by the one or more mobile computing device processors to: receive an indication that the distance between the mobile computing device and the wearable computing device exceeds the threshold distance, and responsive to receiving the indication that the distance between the mobile computing device and the wearable computing device exceeds the threshold distance, change the access mode of the computing environment provided by the mobile computing device from the increased access mode to the reduced access mode.

Clause 18. The system of clause 17, wherein the wearable computing device access mode module is further operable by the one or more wearable computing device processors to output an alert that the distance between the mobile computing device and the wearable computing device has exceeded the threshold distance.

Clause 19. The system of clause 17 or 18, wherein the mobile computing device access mode module is further operable by the one or more mobile computing device processors to: after changing the access mode of the computing environment provided by the mobile computing device from the increased access mode to the reduced access mode, receive an indication that the distance between the mobile computing device and the wearable computing device is less than the threshold distance; and responsive to receiving the indication that the distance between the mobile computing device and the wearable computing device is less than the threshold distance, change the access mode of the computing environment provided by the mobile computing device from the reduced access mode to the increased access mode.

Clause 20. The system of any of clauses 11 to 19, wherein the sensor generates, after the access modes of the computing environments provided by the mobile computing device and the wearable computing device have been changed, an indication that the wearable computing device is not being worn by the user, wherein the mobile computing device access mode module is further operable by the one or more mobile computing device processors to, responsive to receiving the indication that the wearable computing device is not being worn by the user, change the access mode of the computing environment provided by the mobile computing device from the increased access mode to the reduced access mode, and wherein the wearable computing device access mode module is further operable by the one or more wearable mobile computing device processors to, responsive to receiving the indication that the wearable computing device is not being worn by the user, change the access mode of the computing environment provided by the wearable computing device from the increased access mode to the reduced access mode.

Clause 21. A computer-readable storage device storing instructions that, when executed, cause at least one processor of a mobile computing device to: receive, from a wearable computing device, an indication that the wearable computing device is being worn by a user; determine that a distance between the wearable computing device and the mobile computing device is less than a threshold distance; change, based at least in part on the indication that the wearable computing device is being worn by the user and the determination that the distance between the wearable computing device and the mobile computing device is less than the threshold distance, an access mode of the computing environment provided by the mobile computing device from a reduced access mode to an increased access mode; and transmit, to the wearable computing device, an instruction to change an access mode of a computing environment provided by the wearable computing device from a reduced access mode to an increased access mode.

Clause 22. The computer-readable storage device of claim 21, further comprising instructions that, when executed, cause the at least one processor of the mobile computing device to: responsive to receiving the indication that the wearable computing device is being worn by the user and determining that the distance between the wearable computing device and the mobile computing device is less than the threshold distance, output a security challenge, and wherein the instructions that, when executed, cause the at least one processor of the mobile computing device to change, based at least in part on the indication that the wearable computing device is being worn by the user and the determination that the distance between the wearable computing device and the mobile computing device is less than the threshold distance, the access mode of the computing environment provided by the mobile computing device from the reduced access mode to the increased access mode comprise instructions that, when executed, cause the at least one processor of the mobile computing device to change, based at least in part on the indication that the wearable computing device is being worn by the user, the determination that the distance between the wearable computing device and the mobile computing device is less than the threshold distance, and an indication of a response to the security challenge, the access mode of the computing environment provided by the mobile computing device from the reduced access mode to the increased access mode.

Clause 23. The computer-readable storage device of clause 21 or 22, wherein the instructions that, when executed, cause the at least one processor of the mobile computing device to determine that the distance between the wearable computing device and the mobile computing device is less than the threshold distance cause the at least one processor of the mobile computing device to: receive an indication of a wireless communication link between the wearable computing device and the mobile computing device; responsive to receiving the indication of the wireless communication link, determine, based on a signal strength of the wireless communication link, an approximate distance between the wearable computing device and the mobile computing device; and compare the approximate distance between the wearable computing device and the mobile computing device to the threshold distance.

Clause 24. The computer-readable storage device of clause 21 or 22, wherein the instructions that, when executed, cause the at least one processor of the mobile computing device to determine that the distance between the wearable computing device and the mobile computing device is less than the threshold distance cause the at least one processor of the mobile computing device to receive an indication of a wireless communication link between the wearable computing device and the mobile computing device.

Clause 25. The computer-readable storage device of any of clauses 21 to 24, further comprising instructions that, when executed, cause the at least one processor of the mobile computing device to: after changing the access mode of the computing environment provided by the mobile computing device from the reduced access mode to the increased access mode, determine that the distance between the mobile computing device and the wearable computing device exceeds the threshold distance; change, based at least in part on determining that the distance between the mobile computing device and the wearable computing device exceeds the threshold distance, the access mode of the computing environment provided by the mobile computing device from the increased access mode to the reduced access mode; and transmit, to the wearable computing device, an indication that the distance between the mobile computing device and the wearable computing device exceeds the threshold distance.

Clause 26. The computer-readable storage device of clause 25, further comprising instructions that, when executed, cause the at least one processor of the mobile computing device to: after changing the access mode of the computing environment provided by the mobile computing device from the increased access mode to the reduced access mode, determine that the distance between the mobile computing device and the wearable computing device is less than the threshold distance; and responsive to determining that the distance between the mobile computing device and the wearable computing device is less than the threshold distance, change the access mode of the computing environment provided by the mobile computing device from the reduced access mode to the increased access mode.

Clause 27. The computer-readable storage device of any of clauses 21 to 26, further comprising instructions that, when executed, cause the at least one processor of the mobile computing device to: after changing the access mode of the computing environment provided by the mobile computing device from the reduced access mode to the increased access mode, receive, from the wearable computing device, an indication that the wearable computing device is not being worn by the user; and responsive to receiving the indication that the wearable computing device is not being worn by the user, change the access mode of the computing environment provided by the mobile computing device from the increased access mode to the increased access mode.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
receiving, by a processor of a wearable computing device, an indication that the wearable computing device is being worn by a user;
changing, by the processor of the wearable computing device, based at least in part on the indication that the wearable computing device is being worn and on an indication that a distance between the wearable computing device and a mobile computing device is less than a threshold distance, an access mode of a computing environment of the wearable computing device from a reduced access security mode to an increased access security mode in which the user is permitted access to a larger set of functionality provided by the wearable computing device than when in the reduced access security mode; and
responsive to at least the indication that the wearable computing device is being worn and the indication that a distance is less than the threshold distance, transmitting, by the wearable computing device, to the mobile computing device, a signal configured to cause the mobile computing device to change an access mode of a computing environment of the mobile computing device from a reduced access security mode to an increased access security mode in which the user is permitted access to a larger set of functionality provided by the mobile computing device than when in the reduced access security mode.

2. The method of claim 1, wherein the processor of the wearable computing device generates the indication that the distance between the wearable computing device and the mobile computing device is less than the threshold distance.

3. The method of claim 2, wherein the indication that the distance between the wearable computing device and the mobile computing device is less than the threshold distance is generated by:
receiving, by the processor of the wearable computing device, an indication of a wireless communication link between the wearable computing device and the mobile computing device;
responsive to receiving the indication of the wireless communication link, determining, based on a signal strength of the wireless communication link, an approximate distance between the wearable computing device and the mobile computing device; and
determining that the approximate distance between the wearable computing device and the mobile computing device is less than the threshold distance.

4. The method of claim 2, wherein the indication that the distance between the wearable computing device and the mobile computing device is less than the threshold distance is generated by:
receiving, by the processor of the wearable computing device, an indication of a wireless communication link between the wearable computing device and the mobile computing device.

5. The method of claim 1, further comprising:
receiving, by the processor of the wearable computing device, from the mobile computing device, the indication that the distance between the wearable computing device and the mobile computing device is less than the threshold distance.

6. The method of claim 1, wherein the processor of the wearable computing device receives the indication that the wearable computing device is being worn by the user from a sensor, and wherein the sensor comprises at least one of a proximity sensor, an infrared sensor, a camera, a physical contact on a connecting structure of the wearable computing device, an electrical contact on a connecting structure of the wearable computing device, and a pressure sensor.

7. The method of claim 1, further comprising:
responsive to receiving the indication that the wearable computing device is being worn by the user and based at least in part on the indication that the distance between the wearable computing device and the mobile computing device is less than a threshold distance, outputting, by the processor of the wearable computing device, a security challenge;
receiving, by the processor of the wearable computing device, an indication of a response to the security challenge, and
wherein changing, based at least in part on the indication that the wearable computing device is being worn and the indication that the distance is less than the threshold distance, the access mode of the computing environment of the wearable computing device from the reduced access security mode to the increased access security mode comprises changing, based at least in part on the indication that the wearable computing device is being worn, the indication that the distance is less than the threshold distance, and an indication of the response to the security challenge, the access security mode of the computing environment of the wearable computing device from the reduced access security mode to the increased access security mode.

8. The method of claim 1, further comprising:
after changing the access security mode of the computing environment of the wearable computing device, receiving, by the processor of the wearable computing device, an indication that the distance between the mobile computing device and the wearable computing device exceeds the threshold distance; and
responsive to receiving the indication that the distance between the mobile computing device and the wearable computing device exceeds the threshold distance, transmitting, by the processor of the wearable computing device, to the mobile computing device, an instruction to change the access security mode of the computing environment of the mobile computing device from the increased access security mode to the reduced access security mode.

9. The method of claim 8, further comprising outputting, by the processor of the wearable computing device, an alert that the distance between the mobile computing device and the wearable computing device has exceeded the threshold distance.

10. The method of claim 1, further comprising:
after changing the access security mode of the computing environment of the wearable computing device, receiving, by the processor of the wearable computing device, an indication that the wearable computing device is not being worn by the user of the wearable computing device; and
responsive to receiving the indication that the wearable computing device is not being worn by the user, changing, by the processor of the wearable computing device, the access security mode of the computing environment of the wearable computing device from the increased access security mode to the reduced access security mode, and transmitting, by the processor of the wearable computing device, to the mobile computing device, an instruction to change the access security mode of the computing environment of the mobile computing device from the increased access security mode to the reduced access security mode.

11. A system comprising:
a mobile computing device comprising one or more mobile computing device processors;
a wearable computing device comprising one or more wearable computing device processors and a sensor, wherein the sensor is configured to generate an indication that the wearable computing device is being worn by a user;
a mobile computing device access mode module operable by the one or more mobile computing device processors to receive the indication that the wearable computing device is being worn by the user and change, based at least in part on the indication that the wearable computing device is being worn by the user and an indication that a distance between the wearable computing device and the mobile computing device is less than a threshold distance, an access mode of a computing environment of the mobile computing device from a reduced access security mode to an increased access security mode in which the user is permitted access to a larger set of functionality provided by the mobile computing device than when in the reduced access security mode; and
a wearable computing device access mode module operable by the one or more wearable computing device processors to receive the indication that the wearable computing device is being worn by the user and change, based at least in part on the indication that the wearable computing device is being worn by the user and the indication that the distance between the wearable computing device and the mobile computing device is less than the threshold distance, an access mode of a computing environment of the wearable computing device from a reduced access security mode to an increased access security mode in which the user is permitted access to a larger set of functionality provided by the wearable computing device than when in the reduced access security mode.

12. The system of claim 11, further comprising a vicinity module operable by at least one processor of the one or more wearable computing device processors or the one or more mobile computing device processors to determine that a distance between the wearable computing device and the mobile computing device is less than a threshold distance and generate the indication that the distance between the wearable computing device and the mobile computing device is less than the threshold distance.

13. The system of claim 12, wherein the vicinity module is operable by the at least one processor of the one or more wearable computing device processors or the one or more mobile computing device processors to:
receive an indication of a wireless communication link between the wearable computing device and the mobile computing device;
responsive to receiving the indication of the wireless communication link, determine, based on a signal strength of the wireless communication link, an approximate distance between the wearable computing device and the mobile computing device; and
determine that the approximate distance between the wearable computing device and the mobile computing device is less than the threshold distance.

14. The system of claim 11, wherein the mobile computing device access mode module is further operable by the one or more mobile computing device processors to:
responsive to receiving the indication that the wearable computing device is being worn by the user and the indication that the distance between the wearable computing device and the mobile computing device is less than the threshold distance, output a security challenge;
receive an indication of a response to the security challenge;
verify the response to the security challenge against a saved security challenge response;
change, based at least in part on the indication that the wearable computing device is being worn by the user, the indication that the distance between the wearable computing device and the mobile computing device is less than the threshold distance, and the indication of the response to the security challenge, the access mode of the computing environment provided by of the mobile computing device from the reduced access security mode to the increased access security mode; and
transmit, responsive to receiving the indication that the wearable computing device is being worn by the user, the indication that the distance between the wearable computing device and the mobile computing device is less than the threshold distance, and the indication of the response to the security challenge, to the wearable computing device, a signal configured to cause the wearable computing device to change the access mode of the computing environment of the wearable computing device from the reduced access security mode to the increased access security mode.

15. The system of claim 11, wherein the sensor comprises at least one of a proximity sensor, an infrared sensor, a camera, a physical contact on a connecting structure of the wearable computing device, an electrical contact on a connecting structure of the wearable computing device, and a pressure sensor.

16. The system of claim 11, further comprising a telemetry module operable by at least one of the one or more mobile computing device processors and the one or more mobile computing device processors to, prior to the vicinity module determining that the distance between the wearable computing device and the mobile computing device is less than the threshold distance, establish a wireless communication link between the wearable computing device and the mobile computing device.

17. The system of claim 11, wherein the mobile computing device access mode module is operable by the one or more mobile computing device processors to:
receive an indication that the distance between the mobile computing device and the wearable computing device exceeds the threshold distance, and
responsive to receiving the indication that the distance between the mobile computing device and the wearable computing device exceeds the threshold distance, change the access mode of the computing environment of the mobile computing device from the increased access security mode to the reduced access security mode.

18. The system of claim 17, wherein the wearable computing device access mode module is further operable by the one or more wearable computing device processors to output an alert that the distance between the mobile computing device and the wearable computing device has exceeded the threshold distance.

19. The system of claim 17, wherein the mobile computing device access mode module is further operable by the one or more mobile computing device processors to:
after changing the access mode of the computing environment of the mobile computing device from the increased access security mode to the reduced access security mode, receive an indication that the distance between the mobile computing device and the wearable computing device is less than the threshold distance; and
responsive to receiving the indication that the distance between the mobile computing device and the wearable computing device is less than the threshold distance, change the access mode of the computing environment of the mobile computing device from the reduced access security mode to the increased access security mode.

20. The system of claim 11, wherein
the sensor generates, after the access modes of the computing environments provided by the mobile computing device and the wearable computing device have been changed, an indication that the wearable computing device is not being worn by the user,
the mobile computing device access mode module is further operable by the one or more mobile computing device processors to, responsive to receiving the indication that the wearable computing device is not being worn by the user, change the access mode of the computing environment of the mobile computing device from the increased access security mode to the reduced access security mode, and
the wearable computing device access mode module is further operable by the one or more wearable mobile computing device processors to, responsive to receiving the indication that the wearable computing device is not being worn by the user, change the access mode of the computing environment of the wearable computing device from the increased access security mode to the reduced access security mode.

21. A computer-readable storage device storing instructions that, when executed, cause at least one processor of a mobile computing device to:
receive, from a wearable computing device, an indication that the wearable computing device is being worn by a user;
determine that a distance between the wearable computing device and the mobile computing device is less than a threshold distance;
change, based at least in part on the indication that the wearable computing device is being worn by the user and the determination that the distance between the wearable computing device and the mobile computing device is less than the threshold distance, an access mode of the computing environment of the mobile computing device from a reduced access security mode to an increased access security mode in which the user is permitted access to a larger set of functionality provided by the mobile computing device than when in the reduced access security mode; and
transmit, to the wearable computing device, a signal configured to cause the wearable computing device to change an access mode of a computing environment of the wearable computing device from a reduced access security mode to an increased access security mode in which the user is permitted access to a larger set of functionality provided by the wearable computing device than when in the reduced access security mode.

22. The computer-readable storage device of claim 21, further comprising instructions that, when executed, cause the at least one processor of the mobile computing device to:
responsive to receiving the indication that the wearable computing device is being worn by the user and determining that the distance between the wearable computing device and the mobile computing device is less than the threshold distance, output a security challenge, and
wherein the instructions that, when executed, cause the at least one processor of the mobile computing device to change, based at least in part on the indication that the wearable computing device is being worn by the user and the determination that the distance between the wearable computing device and the mobile computing device is less than the threshold distance, the access mode of the computing environment of the mobile computing device from the reduced access security mode to the increased access security mode comprise instructions that, when executed, cause the at least one processor of the mobile computing device to change, based at least in part on the indication that the wearable computing device is being worn by the user, the determination that the distance between the wearable computing device and the mobile computing device is less than the threshold distance, and an indication of a response to the security challenge, the access mode of the computing environment of the mobile computing device from the reduced access security mode to the increased access security mode.

23. The computer-readable storage device of claim 21, wherein the instructions that, when executed, cause the at least one processor of the mobile computing device to determine that the distance between the wearable computing device and the mobile computing device is less than the threshold distance cause the at least one processor of the mobile computing device to:
receive an indication of a wireless communication link between the wearable computing device and the mobile computing device;
responsive to receiving the indication of the wireless communication link, determine, based on a signal strength of the wireless communication link, an approximate distance between the wearable computing device and the mobile computing device; and
determine that the approximate distance between the wearable computing device and the mobile computing device is less than the threshold distance.

24. The computer-readable storage device of claim 21, wherein the instructions that, when executed, cause the at least one processor of the mobile computing device to determine that the distance between the wearable computing device and the mobile computing device is less than the threshold distance cause the at least one processor of the mobile computing device to receive an indication of a wireless communication link between the wearable computing device and the mobile computing device.

25. The computer-readable storage device of claim 21, further comprising instructions that, when executed, cause the at least one processor of the mobile computing device to:
after changing the access mode of the computing environment of the mobile computing device from the reduced access security mode to the increased access security mode, determine that the distance between the mobile computing device and the wearable computing device exceeds the threshold distance;
change, based at least in part on determining that the distance between the mobile computing device and the wearable computing device exceeds the threshold distance, the access mode of the computing environment of the mobile computing device from the increased access security mode to the reduced access security mode; and
transmit, to the wearable computing device, an indication that the distance between the mobile computing device and the wearable computing device exceeds the threshold distance.

26. The computer-readable storage device of claim 25, further comprising instructions that, when executed, cause the at least one processor of the mobile computing device to:
after changing the access mode of the computing environment of the mobile computing device from the increased access security mode to the reduced access security mode, determine that the distance between the mobile computing device and the wearable computing device is less than the threshold distance; and
responsive to determining that the distance between the mobile computing device and the wearable computing device is less than the threshold distance, change the access mode of the computing environment of the mobile computing device from the reduced access security mode to the increased access security mode.

27. The computer-readable storage device of claim 21, further comprising instructions that, when executed, cause the at least one processor of the mobile computing device to:
after changing the access mode of the computing environment of the mobile computing device from the reduced access security mode to the increased access security mode, receive, from the wearable computing device, an indication that the wearable computing device is not being worn by the user; and responsive to receiving the indication that the wearable computing device is not being worn by the user, change the access mode of the computing environment of the mobile computing device from the increased access security mode to the reduced access security mode.

* * * * *